US012779252B2

(12) United States Patent
Shou et al.

(10) Patent No.: US 12,779,252 B2
(45) Date of Patent: Nov. 3, 2026

(54) AIR-CONDITIONED FACEMASK

(71) Applicant: THE HONG KONG POLYTECHNIC UNIVERSITY, Hong Kong (CN)

(72) Inventors: Dahua Shou, Hong Kong (CN); Guanghan Huang, Hong Kong (CN); Jintu Fan, Hong Kong (CN); Wing Sze Suen, Hong Kong (CN)

(73) Assignee: The Hong Kong Polytechnic University, Hong Kong (CN)

(*) Notice: Subject to any disclaimer, the term of this patent is extended or adjusted under 35 U.S.C. 154(b) by 807 days.

(21) Appl. No.: 18/246,885

(22) PCT Filed: Sep. 29, 2021

(86) PCT No.: PCT/CN2021/121613
§ 371 (c)(1),
(2) Date: Mar. 28, 2023

(87) PCT Pub. No.: WO2022/068857
PCT Pub. Date: Apr. 7, 2022

(65) Prior Publication Data

US 2023/0364448 A1 Nov. 16, 2023

Related U.S. Application Data

(60) Provisional application No. 63/198,121, filed on Sep. 30, 2020.

(51) Int. Cl.
*A62B 9/00* (2006.01)
*A41D 13/11* (2006.01)
(Continued)

(52) U.S. Cl.
CPC .............. *A62B 9/003* (2013.01); *A41D 13/11* (2013.01); *A62B 18/006* (2013.01); *A62B 18/025* (2013.01); *A62B 23/025* (2013.01)

(58) Field of Classification Search
CPC ..... A62B 9/003; A62B 23/025; A62B 18/006; A62B 18/025; A62B 18/00; A62B 18/003;
(Continued)

(56) References Cited

U.S. PATENT DOCUMENTS 2,845,926 A * 8/1958 Hill ...................... A62B 23/025 128/206.17
3,635,037 A 1/1972 Hubert
(Continued)

FOREIGN PATENT DOCUMENTS

CN 2690955 Y * 4/2005
CN 102210911 A * 10/2011 ............... A62B 7/00
(Continued)

OTHER PUBLICATIONS

English translation for CN 2690955, machine translated by espacenet. com.*
(Continued)

*Primary Examiner* — Tu A Vo
(74) *Attorney, Agent, or Firm* — S&F/WEHRW

(57) ABSTRACT

In a facemask (100), atmospheric air is filtered by a disposable surgical mask (180) to form respirable air. The facemask (100) has a frame (150) formed with an interior cavity (151) for storing the respirable air to be breathed by the user. A thermoregulation unit (110) mounted to the frame (150) provides air conditioning to the respirable air by using a fan (421) to draw the respirable air from the cavity (151) to a heat exchanger (425) that contacts a thermoelectric module (410) to thermoelectrically transport heat to outside the frame (150), thereby cooling the drawn respirable air and condensing water vapor therein. The condensed water vapor is trapped by the heat exchanger (425). Cool and dry respirable air is released back to the cavity (151), thus
(Continued)

providing thermal comfort to the user during breathing. A heat sink (432) contacted with the thermoelectric module (410) is used with a fan (431) to efficiently dissipate heat from the thermoelectric module (410) to outside the frame (150).

23 Claims, 20 Drawing Sheets

(51) Int. Cl.
*A62B 18/00* (2006.01)
*A62B 18/02* (2006.01)
*A62B 23/02* (2006.01)

(58) Field of Classification Search
CPC ....... A62B 18/02; A62B 18/04; A62B 18/045; A62B 18/06; A62B 18/08; A62B 18/082; A62B 18/084; A62B 18/086; A62B 18/088; A62B 18/10; A62B 19/00; A62B 23/00; A62B 23/02; A62B 23/06; A62B 9/00; A62B 7/12; A62B 7/10; A62B 17/04; A41D 13/11; A41D 13/1107; A41D 13/1115; A41D 13/1123; A41D 13/113; A41D 13/1138; A41D 13/1146; A41D 13/1153; A41D 13/1161; A41D 13/1169; A41D 13/1176; A41D 13/1184; A41D 13/1192; A61F 9/068
See application file for complete search history.

(56) References Cited

U.S. PATENT DOCUMENTS 4,237,877 A * 12/1980 Boehler ............... A62B 18/006 128/203.29
5,193,347 A * 3/1993 Apisdorf ............ G05D 23/1919 62/259.3
5,452,712 A * 9/1995 Richardson ............ A62B 17/04 128/201.28
5,655,374 A * 8/1997 Santilli .............. A41D 13/1218 2/905
6,125,636 A * 10/2000 Taylor .................... H10N 10/00 62/3.5
6,460,539 B1 10/2002 Japuntich et al.
10,314,346 B2 6/2019 Potnis et al.
2001/0052343 A1* 12/2001 Reedy .................... G05D 27/00 128/204.15
2004/0210151 A1* 10/2004 Tsukashima ........... A61B 5/083 600/532
2008/0066484 A1* 3/2008 Blackstone ............. F25D 15/00 62/421
2008/0202516 A1* 8/2008 Harvie ................... A62B 9/003 128/204.15
2015/0352382 A1* 12/2015 Jayaraman ........... A62B 18/025 128/206.13
2017/0246030 A1* 8/2017 Lewis ....................... A61L 2/22
2017/0259088 A1* 9/2017 Garafolo .............. A62B 18/045
2020/0345885 A1* 11/2020 Lewis ....................... A61L 9/14
2021/0244110 A1* 8/2021 Reekers ................... F24F 11/77
2021/0379318 A1* 12/2021 Srinivasan ............. A62B 9/003
2022/0008760 A1* 1/2022 Chen .................... A62B 18/088
2022/0040506 A1* 2/2022 Ansari ................. A62B 18/006
2022/0219026 A1* 7/2022 Wisniewski ........... A62B 18/08
2023/0158196 A1* 5/2023 Taylor .................. A62B 18/006 128/204.21

FOREIGN PATENT DOCUMENTS

CN 109125971 A * 1/2019 ............. A62B 9/022
CN 110025900 A * 7/2019 ............. A62B 18/02
CN 210612330 U * 5/2020
KR 19980059073 U * 10/1998 ............. H10N 10/10
KR 100450867 B1 * 10/2004 ............... A62B 7/10
RU 2644097 C1 * 2/2018 ............... A62B 7/10
WO WO-9324168 A1 * 12/1993 ............. A62B 9/003

OTHER PUBLICATIONS

English translation for CN 110025900, machine translated by espacenet.com.*

* cited by examiner

AIR-CONDITIONED FACEMASK

CROSS REFERENCE TO RELATED APPLICATIONS

This application is the National Stage of International Application No. PCT/CN2021/121613 filed on Sep. 29, 2021, which claims priority to, and the benefit of, U.S. Provisional Patent Application No. 63/198,121 filed on Sep. 30, 2020, the disclosure of which is incorporated by reference herein in its entirety.

ABBREVIATIONS

3D Three-dimensional
AC Air-conditioned
AH Absolute humidity
AT Apparent temperature
COVID-19 Coronavirus disease 2019
HF Humidity Feeling
HP Humidity Preference
OC Overall Comfort
PCM Phase change material
PLA Polylactic acid
PPE Personal protective equipment
TP Thermal Preference
TSV Thermal Sensations Vote

FIELD OF THE INVENTION

The present invention relates to a facemask that provides air conditioning.

BACKGROUND

PPE is widely utilized as an infection control strategy in healthcare settings. Respiratory PPE, such as a filtering facepiece respirator and a surgical mask (also known as a medical mask), has been developed to protect human beings against inhalation of hazardous substances and infections, by filtering toxic particles, viruses, and bacteria shed in liquid droplets from the wearer's mouth and nose. Surgical masks, which are widely used to prevent the spread of viruses such as COVID-19 and influenza, have demonstrated a significant reduction (>90%) in virus infection of the wearers. In the COVID-19 pandemic, many countries encouraged early use of masks in the pandemic as a general measure in infection control, while recognition of the importance of wearing masks grew to a global scale thereafter. In the latest research, it has been found that wearing masks in public is the most effective and inexpensive way to prevent inter-human transmission of viruses against the outbreak of COVID-19.

In general, masks are composed of three layers, with a melt-blown microfiber filter between two spunbond fabric layers. The melt-blown layer acts as the major filter that stops microbes from entering or exiting the mask, while the outer non-woven layer is liquid-resistant and repellent to external liquid droplets and the inner non-woven layer is skin-friendly and moisture absorbent. Despite great protection and insulation from toxins and viruses, masks have caused soaring temperature and thick humid air as side effects that lead to significant discomfort for a substantial number of people and their breathing difficulties. The air temperature inside the mask greatly affects human thermal sensations. As well, when wearers such as construction workers, firefighters, or medical personnel become highly active or work under high tension, the excessive heat and sweat generated inside and outside surgical mask facilitates adherence to viruses and worsens the working performance and time of the wearers. The hot and humid environment in tropical regimes such as Hong Kong or in a summer season can further increase the elevated risk of heat illnesses including heat stroke and heat exhaustion. Moreover, current surgical masks often do not fit to the wearer's face due to their loose fit design and the facemask can be contacted and wetted by the wearer's mouth. As such, it is increasingly important to design and develop a new design of surgical mask with thermal comfort and tolerability improvement for the wear duration without compromising filtration performance.

One type of facemask as disclosed in U.S. Pat. No. 6,460,539 specifically helps to release the wearer's hot exhaled breath through a valve, in order to reduce the heat and moisture level inside the facepiece. However, the risk of directly releasing virus or toxic particles along with the breath from an infected wearer is significantly increased, which cannot prevent spreading of the virus disease. As well, it cannot cool the wearer in an extremely hot and humid environment based on air ventilation.

Another type of facemask as disclosed in U.S. Pat. No. 10,314,346, coated with discontinuous patterns of PCMs, helps to cool the microclimate in the internal space of the face mask. The cooling effect is increased by optimized placement of PCMs within the mask construction, by properly determining the amount and density of the PCM in contact with temperature sensitive areas of the wearer's face and the areas experiencing the flux of exhaled breath. However, the duration of the cooling function of PCMs is always limited and it requires cooling down after each time of use. Moreover, it is not cost-effective as this facemask should generally be disposable if it is used against viruses such as COVID-19.

Use of the above-mentioned facemasks is not suitable for wearers without comprehensive consideration of thermal and moisture management under the practical environment and personal conditions, and there are challenges in cooling wearers in extremely hot and humid environments. Moreover, the above-mentioned facemasks cannot cool wearers in extremely hot and humid environments such as Hong Kong, especially in summer. The cost of their use against viruses such as covid-19 is very high in a disposable mode.

There is a need in the art to develop an innovative facemask for wearing and for thermal comfort.

SUMMARY OF THE INVENTION

The present invention provides a facemask for filtering atmospheric air to provide respirable air to a user while providing air conditioning to the respirable air for offering thermal comfort to the user.

The facemask comprises a frame and a thermoregulation unit. The frame is detachably attachable to a face of the user. The frame comprises an interior cavity for storing the respirable air providable to the user. The thermoregulation unit is mountable to the frame for accessing the cavity. In particular, the thermoregulation unit is configured to: draw the respirable air from the cavity into the thermoregulation unit; transfer heat from the drawn respirable air to an ambient atmosphere outside the frame so as to cool down the drawn respirable air and thereby condense at least part of water vapor from the drawn respirable air to form condensed water vapor; remove the condensed water vapor from the drawn respirable air; and release the drawn respirable air to the cavity after the drawn respirable air is cooled and the condensed water vapor is removed such that the respirable air released back to the cavity is cooler and drier than the respirable air originally drawn.

In certain embodiments, the thermoregulation unit comprises a mounting plate and a TE module. The mounting plate is sealingly receivable by the frame for mounting the thermoregulation unit to the frame while avoiding the respirable air in the cavity from fluid communication with the ambient atmosphere. The mounting plate defines a cold side and a hot side of the thermoregulation unit such that the cold side is located in the cavity and the hot side is located outside the cavity when the thermoregulation unit is mounted to the frame. The TE module is installed in the mounting plate and arranged to access both the cold and hot sides. Particularly, the TE module is formed as a Peltier heat pump for thermoelectrically transporting heat from the cold side to the hot side.

In certain embodiments, the thermoregulation unit further comprises a heat exchanger and a cold-side fan both installed on the cold side. The heat exchanger is contacted with the TE module for transferring heat received from the drawn respirable air to the TE module. In addition, the heat exchanger has one or more outlets for releasing the drawn respirable air back to the cavity. The cold-side is coupled to the heat exchanger for drawing the respirable air from the cavity to the heat exchanger.

In certain embodiments, the cold-side fan is user-controllable in rotational speed such that an air flow generated by the cold-side fan is user-controllable.

In certain embodiments, the cold-side fan is a side blow fan.

In one embodiment, the heat exchanger is formed by a heat-exchanger heat sink covered with a perforated metallic sheet, where the perforated metallic sheet comprises a plurality of holes to form the one or more outlets. The heat-exchanger heat sink may be an aluminum plate-fin heat sink, and the perforated metallic sheet may be made of copper. In addition, the plurality of holes may be arranged as two, four or eight rows of holes.

In certain embodiments, the heat-exchanger heat sink comprises one or more arrays of conical rods protruded from a bottom plate for fast draining of the condensed water vapor on the one or more arrays of conical rods to thereby enable fast removal of the condensed water vapor from the drawn respirable air. Respective conical rods in the one or more arrays of conical rods may be coated with superhydrophobic coating, and the bottom plate may be coated with a hydrophilic interface.

Alternatively, the heat exchanger may comprise a first wind guide and a second wind guide serially cascaded together. The first wind guide is arranged to receive the drawn respirable air from the cold-side fan. The second wind guide provides the one or more outlets for releasing the respirable air back to the cavity. In certain embodiments, the first and second wind guides are mutually substantially-perpendicular in orientation. In certain embodiments, the heat exchanger is formed by impermeable copper sheet.

Preferably, the thermoregulation unit further comprises a hot-side heat sink installed on the hot side and contacted with the TE module for receiving heat from the TE module and dissipating the received heat to the ambient atmosphere. The hot-side heat sink may be an aluminum plate-fin heat sink.

It is also preferable that the thermoregulation unit further comprises a hot-side fan installed on the hot side for forcibly dissipating the heat received by the hot-side heat sink.

In certain embodiments, the thermoregulation unit is detachably mountable to the frame.

In certain embodiments, the frame further comprises an opening and a sealing lock. The opening is used for receiving a surgical mask, where the surgical mask is used for filtering the atmospheric air when the atmospheric air enters into the cavity through the surgical mask to augment with the respirable air already present in the cavity. The sealing lock is configured to sealingly fit to a circumference of the opening for securing the surgical mask on the circumference while sealing the opening.

In certain embodiments, the facemask further comprises an L-shaped pipe connecting the surgical mask and an air inlet of the cold-side fan for drawing fresh filtered air nearby the surgical mask directly to the thermoregulation unit for cooling and drying to thereby further improve an air-conditioning performance of the facemask.

In certain embodiments, the facemask further comprises one or more bags of desiccant for reducing a relative humidity of the respirable air in the cavity. Preferably, an individual bag of desiccant is deposited with calcium chloride as a desiccant material.

In certain embodiments, the TE module is user-controllable in setting a direction of heat flow actualized by the TE module in transporting heat energy between the cold and hot sides.

In certain embodiments, the frame is formed by 3D printing.

Other aspects of the present invention are disclosed as illustrated by the embodiments hereinafter.

Skilled artisans will appreciate that elements in the figures are illustrated for simplicity and clarity and have not necessarily been depicted to scale.

DETAILED DESCRIPTION OF THE INVENTION

As used herein in the specification and appended claims, the term "avoid" or "avoiding" refers to any method to partially or completely preclude, avert, obviate, forestall, stop, hinder or delay the consequence or phenomenon following the term "avoid" or "avoiding" from happening. The term "avoid" or "avoiding" does not mean that it is necessarily absolute, but rather effective for providing some degree of avoidance or prevention or amelioration of consequence or phenomenon following the term "avoid" or "avoiding".

Disclosed herein is a facemask for filtering atmospheric air to provide respirable air to a user. Advantageously, the facemask provides air conditioning to the respirable air for providing thermal comfort to the user. The disclosed facemask is exemplarily illustrated with the aid of FIGS. 1-4.

Figure 2:
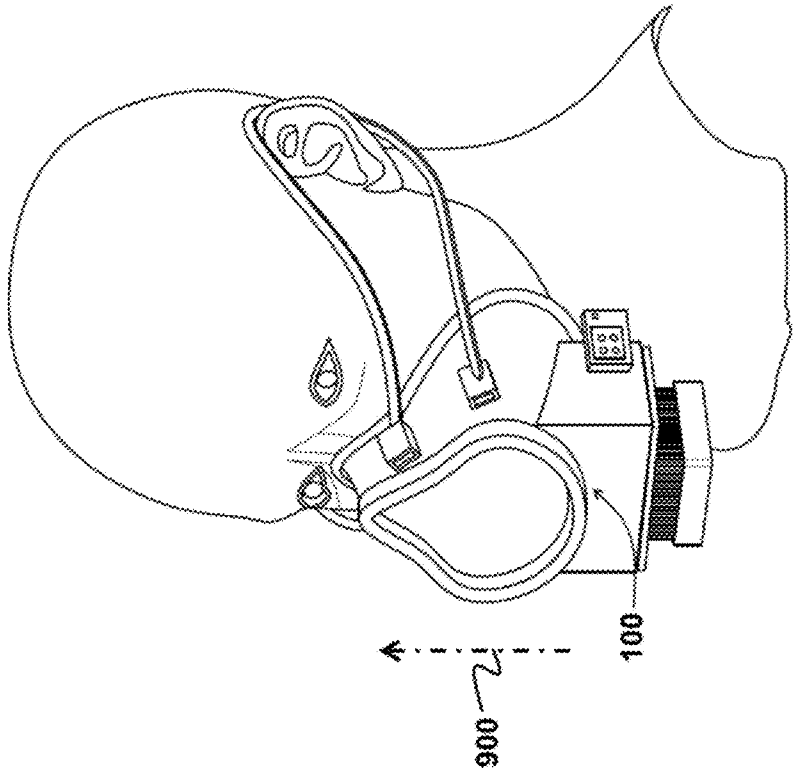
FIG. 2 depicts a perspective view of the facemask of FIG. 1.
Figure 1:
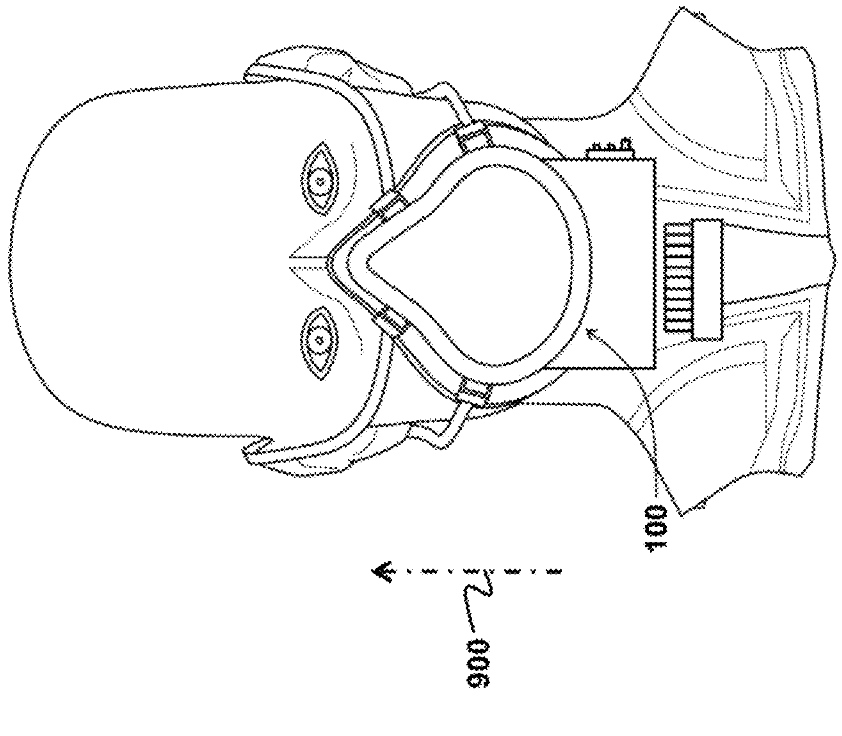
FIG. 1 depicts a front view of a facemask that provides air conditioning in accordance with an exemplary embodiment of the present invention.

FIG. 1 is a front view of an exemplary facemask 100 being worn by a user in accordance with the present invention. FIG. 2 is a perspective view of the facemask 100. FIG.

Figure 3:
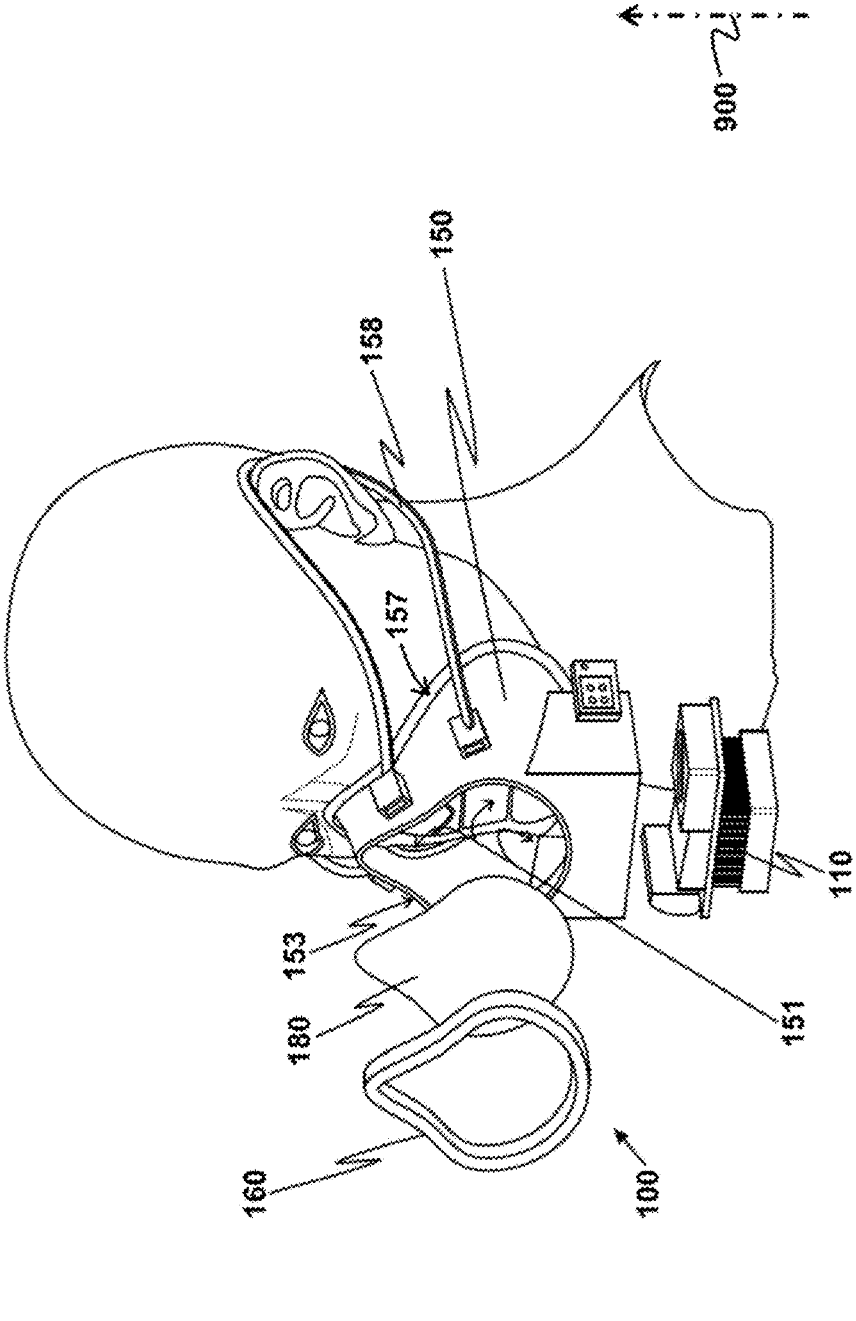
FIG. 3 depicts an exploded view of the facemask of FIG. 1, indicating that the facemask comprises a frame and a thermoregulation unit.

3 is an exploded view of the facemask 100. To facilitate illustration of the facemask 100, a reference vertical direction 900 is defined as shown in FIGS. 1-3. Herein in the specification and appended claims, positional and directional words such as "above," "below," "higher," "upper," "lower," "top," "bottom" and "horizontal" are interpreted with reference to the reference vertical direction 900.

The facemask 100 comprises a frame 150 and a thermoregulation unit 110. The frame 150 is detachably attachable to a face of the user for covering at least nostrils and mouth of the user when the facemask 100 is worn is by the user. The frame 150 comprises an interior cavity 151 as a gas reservoir for storing the respirable air providable to the user. When the facemask 100 is worn by the user and when the user breathes in, the respirable air present in the cavity 151 is inhaled by the user. When the user breathes out, the hot humid air of the user's breath is mixed with the respirable air in the cavity 151, making the respirable air warm and humid. The thermoregulation unit 110 is used for providing air conditioning to the respirable air present in the cavity 151, avoiding the respirable air in the cavity 151 to be excessively hot and overly humid and thereby avoiding discomfort to the user. The thermoregulation unit 110 is mountable to the frame 150 for accessing the cavity 151.

Figure 4:
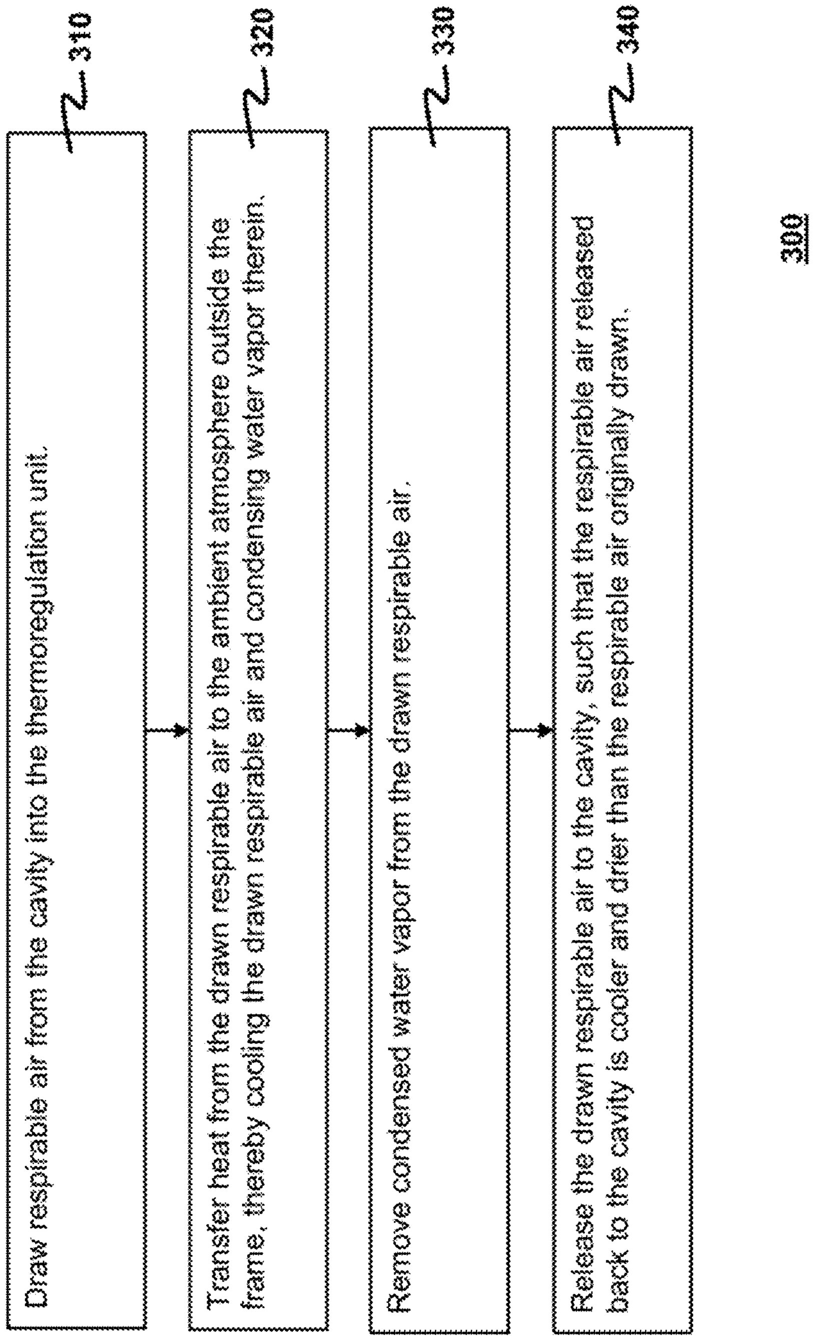
FIG. 4 depicts a sequence of exemplary operations performed by the thermoregulation unit for providing air conditioning.

FIG. 4 depicts a sequence 300 of exemplary steps, viz., operations, performed by the thermoregulation unit 110 to provide air conditioning for cooling and drying the respirable air in the cavity 151. The thermoregulation unit 110 first draws the respirable air from the cavity 151 into the thermoregulation unit 110 (step 310). Afterwards, the thermoregulation unit 110 forcibly transfers heat from the drawn respirable air to an ambient atmosphere outside the frame 150 so as to cool down the drawn respirable air (step 320). As the drawn respirable air is cooled down, at least a part of water vapor content present in the drawn respirable air is condensed, forming condensed water vapor in the thermoregulation unit 110. Note that the condensed water vapor is in liquid form. The thermoregulation unit 110 removes the condensed water vapor from the drawn respirable air (step 330). The condensed water vapor as obtained may be retained in the thermoregulation unit 110 or may be drained away to the ambient atmosphere outside the frame 150. After the drawn respirable air is cooled and the condensed water vapor is removed, the thermoregulation unit 110 releases the drawn respirable air to the cavity 151 such that the respirable air released back to the cavity 151 is cooler and drier than the respirable air originally drawn (step 340). It thereby improves the microclimate of the respirable air inside the cavity 151.

Figure 5:
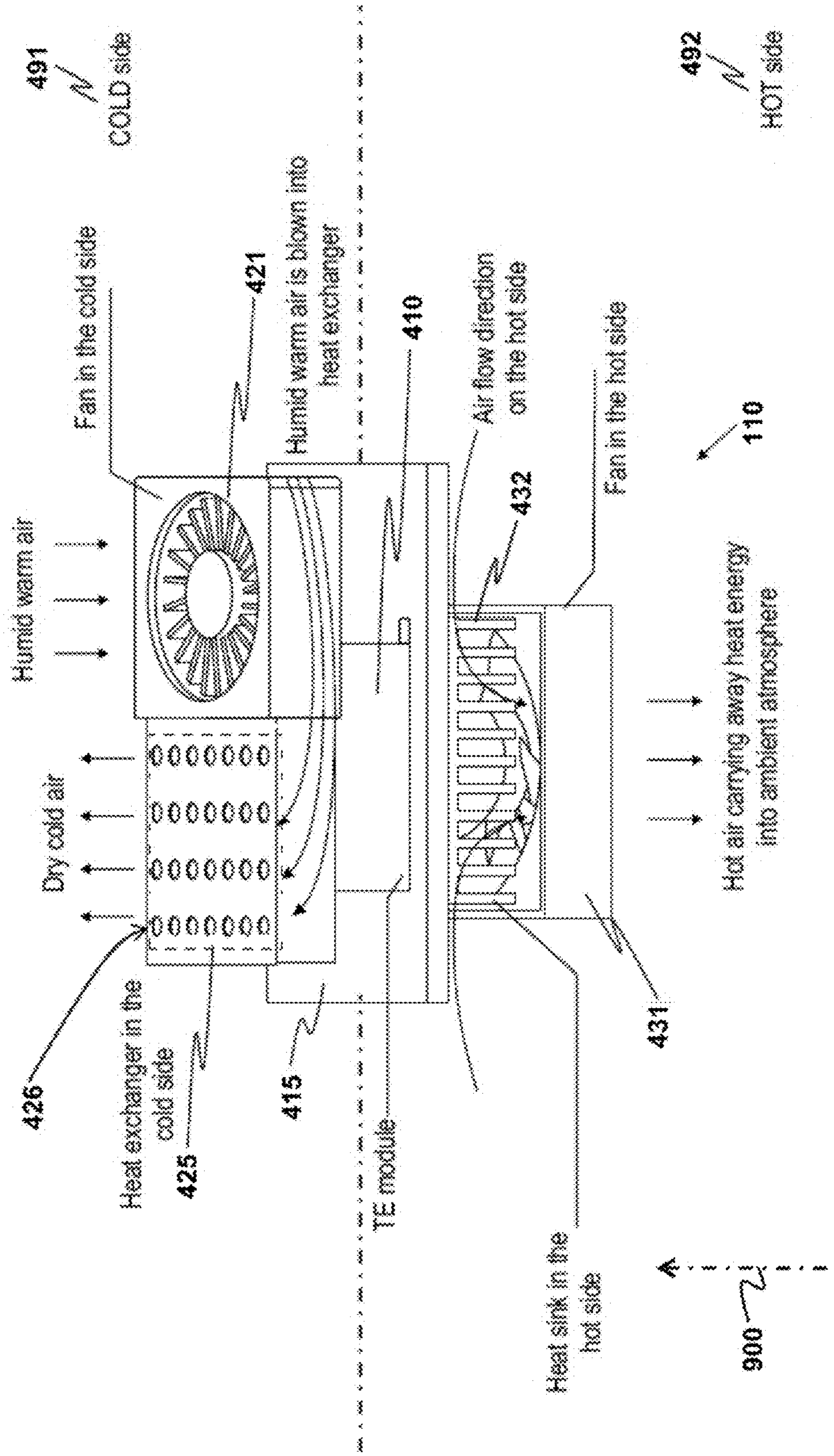
FIG. 5 depicts an embodiment of the thermoregulation unit configured to perform the operation sequence shown in FIG. 4.

FIG. 5 depicts an exemplary embodiment of the thermoregulation unit 110 configured to perform the operation sequence 300. Exemplarily, the thermoregulation unit 110 comprises a mounting plate 415, a TE module 410, a heat exchanger 425 and a cold-side fan 421.

The mounting plate 415 is sealingly receivable by the frame 150 for mounting the thermoregulation unit 110 to the frame 150 while avoiding the respirable air in the cavity 151 from fluid communication with the ambient atmosphere through the mounting plate 415. The mounting plate 415 defines a cold side 491 and a hot side 492 of the thermoregulation unit 110 such that the cold side 491 is located in the cavity 151 and the hot side 492 is located outside the cavity 151 when the thermoregulation unit 110 is mounted to the frame 150. As an illustrative example shown in FIG. 5, the mounting plate 415 is positioned horizontally so that the cold side 491 is a space above the mounting plate 415 and the hot side 492 is another space below the mounting plate 415.

The TE module 410 is installed in the mounting plate 415 and is arranged to access both the cold side 491 and the hot side 492. In particular, the TE module 410 is formed as a Peltier heat pump for thermoelectrically transporting heat from the cold side 491 to the hot side 492. A Peltier heat pump is a solid-state device that transports heat energy from a first surface of the heat pump to a second surface thereof when a voltage difference is applied to the first and second surfaces. Particularly, the direction of heat flow of the Peltier heat pump is governed by a polarity of the voltage difference. Properties and realization schemes of the Peltier heat pump may be found in, e.g., U.S. Pat. No. 3,635,037. In one preferable realization of the TE module 410, the TE module 410 in inserted into the mounting plate 415 with one surface of the TE module 410 exposing to the cold side 491 and another surface thereof exposing to the hot side 492.

The heat exchanger 425 is installed on the cold side 491 and is arranged to receive the drawn respirable air. In addition, the heat exchanger 425 is contacted with the TE module 410 for transferring heat received from the drawn respirable air to the TE module 410 to thereby cool the drawn respirable air. For efficiently transferring the extracted heat energy to the TE module 410, preferably the heat exchanger 425 is composed of one or more thermally conductive materials, such as metal. The heat exchanger 425 is also usable to trap and retain the condensed water vapor so as to remove the condensed water vapor from the drawn respirable air after cooling. The heat exchanger 425 has one or more outlets 426 for releasing the drawn respirable air back to the cavity 151 after the drawn respirable air is cooled and dried.

The cold-side fan 421 is installed on the cold side 491 and is coupled to the heat exchanger 425 for drawing in the respirable air from the cavity 151 and blowing the drawn respirable air to the heat exchanger 425. In one realization, the cold-side fan 421 is a side blow fan. Preferably, the cold-side fan 421 is user-controllable in rotational speed such that an air flow generated by the cold-side fan 421 is user-controllable. Since the respirable air drawn by the cold-side fan 421 is blown back to the cavity 151 through the one or more outlets 426 with a wind speed depending on a speed of the air flow generated by the cold-side fan 421, the user is enabled to adjust the air flow speed for maximizing user comfort.

In performing the operation sequence 300, the cold-side fan 421 is used for performing the step 310; the heat exchanger 425 and the TE module 410 are collectively used for performing the step 320; and the heat exchanger 425 is used for performing the steps 330 and 340. In operation, the cold-side fan 421 draws the respirable air from the cavity 151 to the heat exchanger 425 (the step 310). The drawn respirable air travels inside the heat exchanger 425 and contacts an internal structure (such as wall) of the heat exchanger 425. The TE module 410 is powered to pump heat from the heat exchanger 425 to the ambient atmosphere (the step 320), so that the internal structure is made cooler. The drawn respirable air inside the internal structure is thus cooled down and at least part of water vapor therein is condensed and is locked or retained inside the heat exchanger 425 (the step 330). The heat energy released from the drawn respirable air and then absorbed by the heat exchanger 425 is subsequently conducted to the TE module 410, which transfers the heat energy received from the cold side 491 to the hot side 492 for dissipation into the ambient atmosphere (the step 320). The drawn respirable air after being cooled and dried is blown out from the heat exchanger 425 and returns back to the cavity 151 through the one or more outlets 426 (the step 340).

For enhancing heat transfer efficiency between the TE module 410 and the ambient atmosphere, preferably the thermoregulation unit 110 further comprises a hot-side heat sink 432 installed on the hot side 492 and contacted with the TE module 410 for receiving heat from the TE module 410 and dissipating the received heat to the ambient atmosphere. The hot-side heat sink 432 may be realized as an aluminum plate-fin heat sink.

For further enhancing the heat transfer efficiency, preferably the thermoregulation unit 110 further comprises a hot-side fan 431 installed on the hot side 492 for forcibly dissipating the heat energy from the hot-side heat sink 432 to the ambient atmosphere. The hot-side fan 431 is positioned close to the hot-side heat sink 432. When the hot-side fan 431 is powered, it drives the atmospheric air to pass through the hot-side heat sink 432 for carrying away heat energy therein.

Other implementation details of the facemask 100 are elaborated as follows.

Figure 6B:
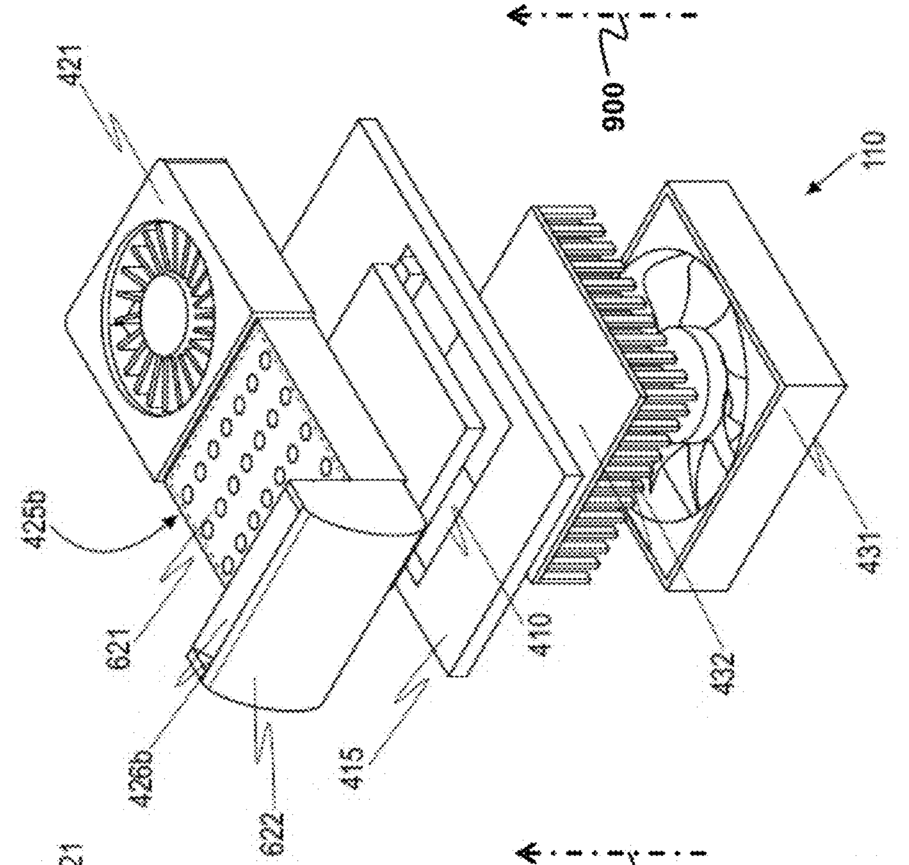
FIG. 6B depicts another realization of the thermoregulation unit in exploded view, illustrating a second embodiment of a heat exchanger installed in the thermoregulation unit.
Figure 6A:
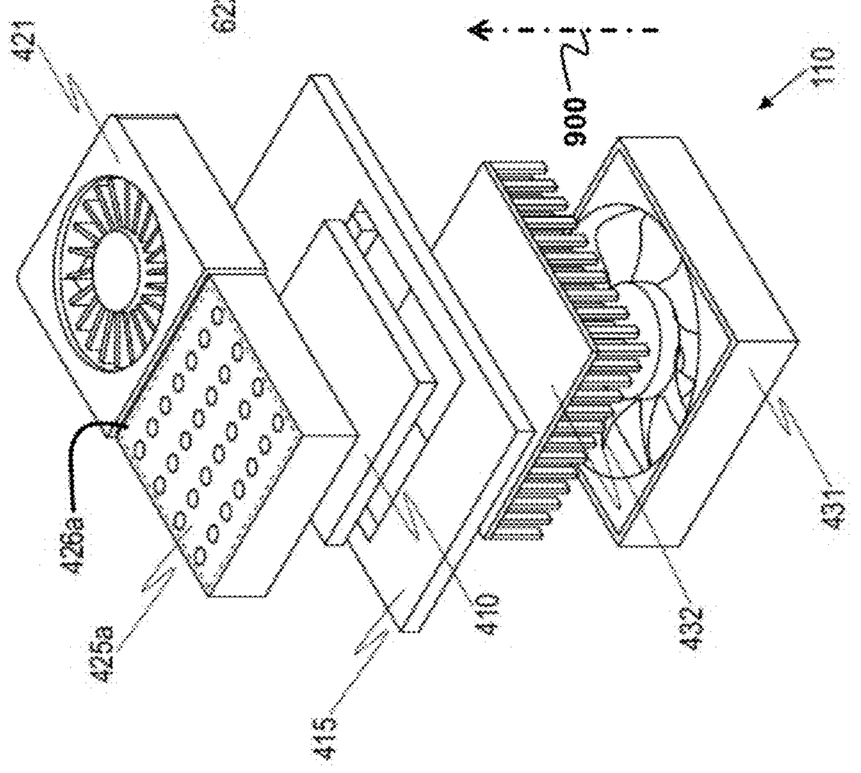
FIG. 6A depicts one realization of the thermoregulation unit in exploded view, illustrating a first embodiment of a heat exchanger installed in the thermoregulation unit.

FIGS. 6A and 6B depict exploded views of two realizations of the thermoregulation unit 110 for illustrating two embodiments of the heat exchanger 425, denoted as a first heat exchanger **425*a* and a second heat exchanger 425*b***, respectively.

The first heat exchanger **425*a* has a plurality of outlets 426*a* for releasing the drawn respirable air back to the cavity 151. Furthermore, the first heat exchanger 425*a* is formed by a heat sink covered with a perforated metallic sheet. The heat-exchanger heat sink may be an aluminum plate-fin heat sink. The perforated metallic sheet may be made of copper. Particularly, the perforated metallic sheet comprises a plurality of holes to form the one or more outlets 426*a*. For convenience, the plurality of holes is also referenced as 426*a*. The plurality of holes 426*a*** may be arranged as a rectangular array of holes with a predetermined number of rows of holes. The number of rows required may be determined according to a use scenario under consideration. The number of rows may be two, four, eight, or any number deemed appropriate by those skilled in the art.

The second heat exchanger **425*b* has an outlet 426*b* for releasing the drawn respirable air back to the cavity 151. The second heat exchanger 425*b* is formed by serially cascading a first wind guide 621 and a second wind guide 622. The first wind guide 621 is connected to the cold-side fan 421 for receiving the drawn respirable air. Furthermore, the first wind guide 621 is positioned on the TE module 410 for facilitating heat transfer. The second wind guide 622 provides the outlet 426*b*. Particularly, the first and second wind guides 621, 622 are mutually substantially-perpendicular in orientation. As an example shown in FIG. 6B, the first wind guide 621 is laid horizontally with respect to the reference vertical direction 900 for intimately contacting the TE module 410 whereas the second wind guide 622 is oriented vertically for blowing out the drawn respirable air after cooling and dehumidifying. In implementation, impermeable copper sheet may be used to form the first wind guide 621, the second wind guide 622, or the whole second heat exchanger 425*b***.

The difference between the first and second heat exchangers **425*a*, 425*b* is in the one or more outlets used for blowing the respirable air back to the cavity 151. The first heat exchanger 425*a* uses the plurality of holes 426*a*, which are usually tiny, for blowing out air, whereas the outlet 426*b* of the second heat exchanger 425***b* for blowing out air is considerably larger than an individual hole of the plurality of holes 426*a*. The two heat exchangers 425*a*, 425*b* cause different perceptual feelings of touch to the user. Which one of the two heat exchangers 425*a*, 425*b* is preferable to the user mostly depends on the user's personal preference on touch feeling.

Preferably, the thermoregulation unit 110 is detachably mountable to the frame 150. One advantage is that cleaning the thermoregulation unit 110 and the frame 150 for sanitation purposes is made more convenient to the user after the thermoregulation unit 110 is withdrawn from the frame 150.

As the facemask 100 is used for filtering atmospheric air to provide the respirable air to the user, the frame 150 is formed with an opening defined by a circumference 153 thereof, where the opening is used for receiving an external, disposable surgical mask 180. The surgical mask 180 is used for filtering the atmospheric air when the atmospheric air enters into the cavity 151 through the surgical mask 180 to augment with the respirable air already present in the cavity 151. Preferably, the frame 150 further comprises a sealing lock 160 configured to sealingly fit to the circumference 153 of the opening. The sealing lock 160 is used for securing the surgical mask 180 on the circumference 153 while sealing the opening to avoid unfiltered air to leak into the cavity 151 to mix with the respirable air therein.

In designing the frame 150, it is important to avoid direct contact between the surgical mask 180 and the user's nose and mouth in order to prevent the surgical mask 180 from being wetted by the sweat or splash from the user directly. Hence, it is desirable that the frame 150 is designed to have a sufficiently large separation between the surgical mask 180 and the user's nose/mouth. Moreover, it provides a sufficient space for air ventilation inside the cavity 151, resulting in improved thermal and wear comfort to the user and enabling the user to easily breathe.

To ensure contact fit and wear comfort, preferably the frame 150 further comprises a sealing cushion 157 molded to an edge of the frame 150 where the frame edge is arranged to contact the user's face. Apart from being soft and elastic for providing comfort to the user, the sealing cushion 157 can also block penetration of external particles and viruses through the contact interface between the frame 150 and the user's face.

Usually, the frame 150 is made detachably attachable to the user's face for covering the user's nose and mouth by using a pair of straps 158 held to the user's ears, as shown in FIG. 3. It is also possible to use an elastic strap or a string to hold the user's head so as to secure the frame 150 on the user's face. Other methods for detachably attaching the facemask 100 to the user's face are also possible.

The frame 150 may be manufactured by a molding process in mass production. Alternatively, the frame 150 may also be formed by 3D printing for small-scale production. Using 3D printing to form the frame 150 has an advantage that the frame 150 can be personalized to the user by designing the frame 150 with a contour to fit the contour of the user's face and chin.

Note that the frame 150 can be reused after sanitizing.

Optionally, the TE module 410 is user-controllable in setting a direction of heat flow actualized by the TE module 410 in transporting heat energy between the cold side 491 and the hot side 492. Controlling the heat flow direction across the TE module 410, which is realized as a Peltier heat pump, is possible as the heat flow direction is determined by a polarity of voltage applied to the Peltier heat pump. Hence, the user is allowed to select heating up or cooling down the respirable air present in the cavity 151 for achieving thermal comfort when the user breathes in.

Some prototypes of the disclosed facemask 100 were developed, manufactured and tested. A detailed dimension description of the thermoregulation unit 110 used in the facemask prototypes is shown in Table 1.

TABLE 1

Different settings for the thermoregulation unit used in the prototypes: (a) cold side; (b) hot side; (c) TE module.

(a) Cold side

| Reference code | Cold-side heat sink (i.e. Heat-exchanger heat sink) | | | | Cold-side fan |
|---|---|---|---|---|---|
| used herein | A | B | C | D | G |
| Dimension ± 1 (mm) (L(mm)*W(mm)*H(mm)) | 30*30*5 | 30*30*5 | 30*30*5 | 30*30*5 | 30*30*6.5 |
| Air blow direction | — | — | — | — | Side blowing |

(b) Hot side

| Reference code used herein | Hot-side heat sink 2 | Hot-side fan A |
|---|---|---|
| Dimension ± 1 (mm) (L(mm)*W(mm)*H(mm)) | 40*40*10 | 40*40*10 |
| Air blow direction | — | Blowing forward |

(c) TE module

| Reference code used herein | TEC1-7104SR |
|---|---|
| Dimension ± 1 (mm) | 30*30*5 |

TABLE 1-continued

| Different settings for the thermoregulation unit used in the prototypes: (a) cold side; (b) hot side; (c) TE module. | |
|---|---|
| (L(mm)*W(mm)*H(mm)) | |
| Air blow direction | — |

Figure 6C:
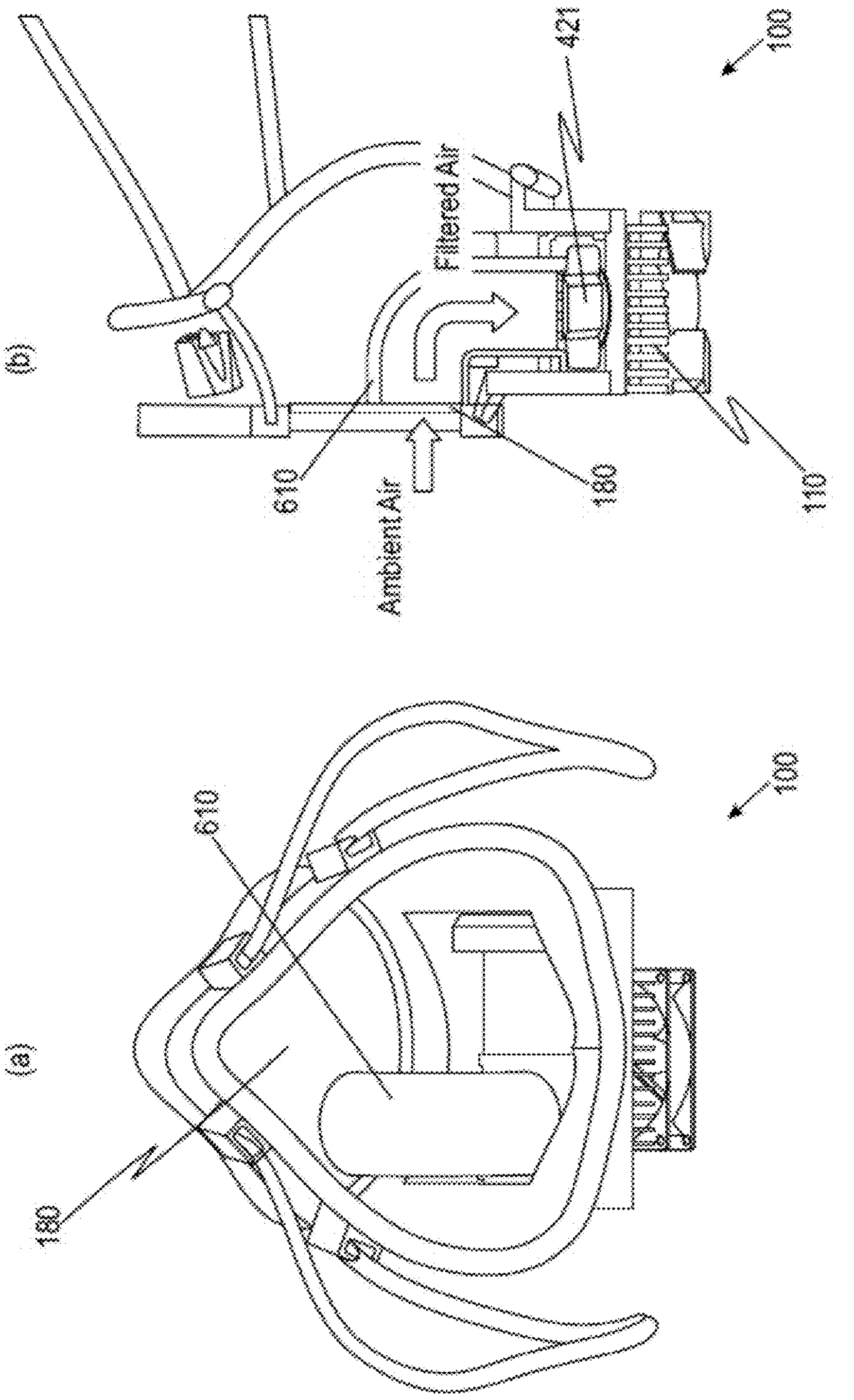
FIG. 6C depicts, in accordance with certain embodiments of the present invention, (a) a rear view of the facemask with an L-shaped pipe installed inside the facemask, and (b) a cross-sectional side view of the facemask for illustrating the working principle of the L-shaped pipe in the facemask.
Figure 6D:
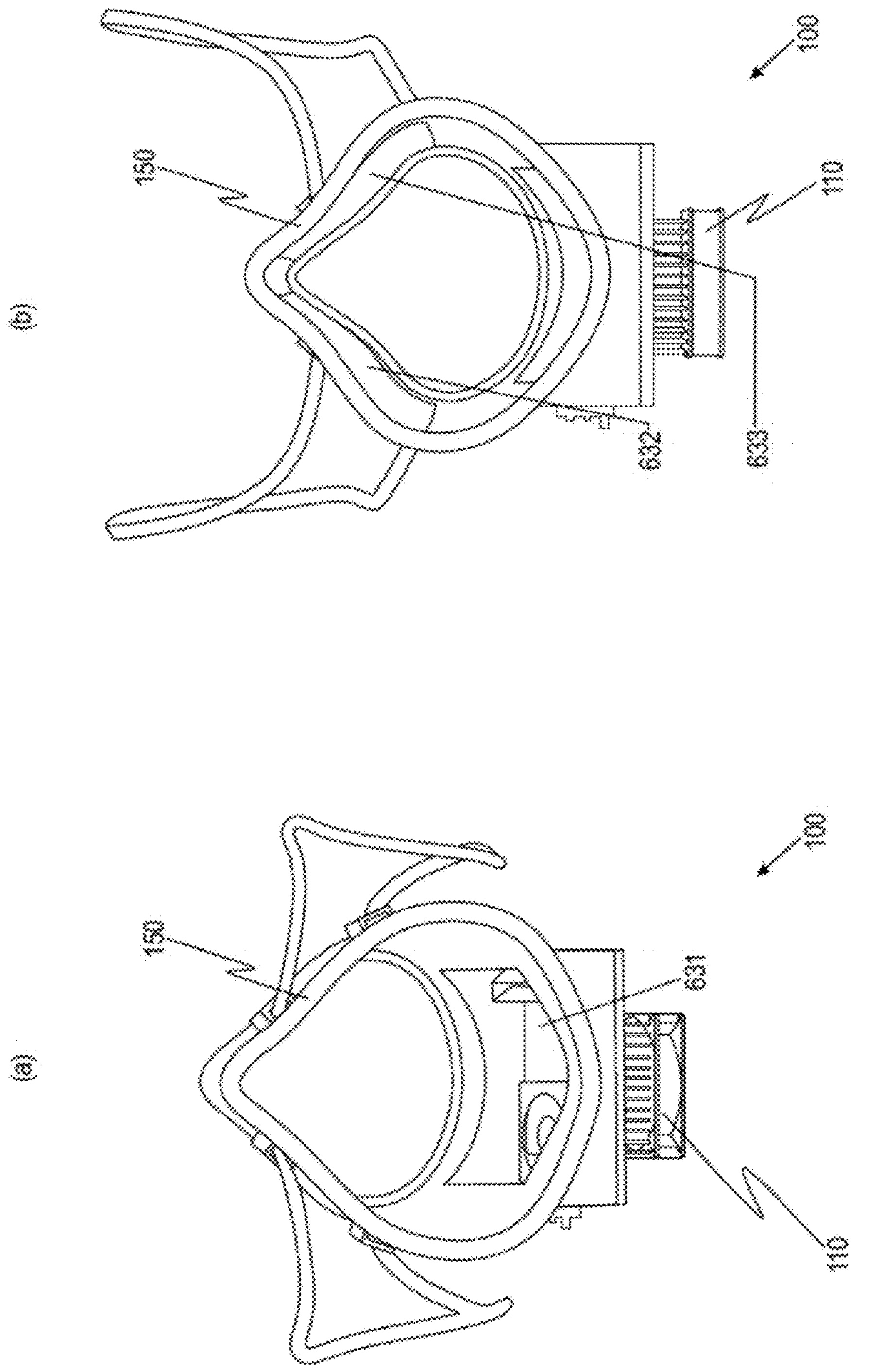
FIG. 6D depicts, in accordance with certain embodiments of the present invention, rear side views of the facemask with allocations of desiccants therein.
Figure 6E:
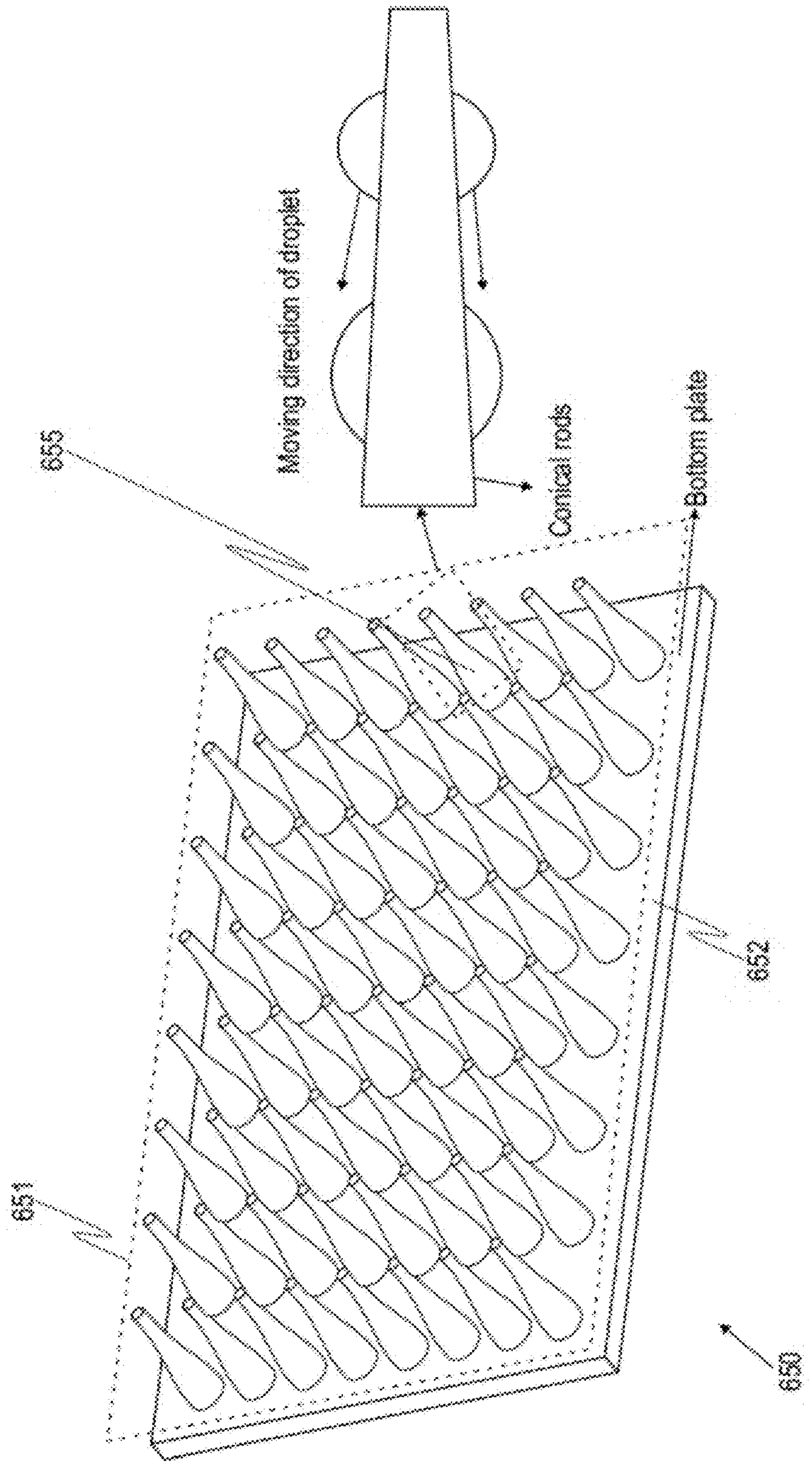
FIG. 6E depicts, in accordance with certain embodiments of the present invention, a novel heat-exchanger heat sink with an array of conical rods, which is applied for fast draining of condensed droplets due to the curve rate difference in two sides.

FIGS. 6C-6E respectively depict embodiments of the facemask 100 with further improvements to user comfort, air-conditioning performance, etc.

FIG. 6C depicts the facemask 100 in (a) rear view and (b) cross-sectional side view. In particular, FIG. 6C depicts an L-shaped pipe 610 connecting the surgical mask 180 and an air inlet of the cold-side fan 421 for drawing fresh filtered air nearby the surgical mask 180 directly to the thermoregulation unit 110 for cooling and drying to thereby further improve the air-conditioning performance of the facemask 100. By suctioning the air from the ambient atmosphere through the surgical mask 180, where the suctioned air has a temperature lower than that of the user's exhaled air, the cooling effect of the thermoregulation unit 110 is improved in comparison to resorting to only internal air circulation. Moreover, the humidity of ambient air is lower than that of human exhaled air, avoiding excessive accumulation of moisture inside the frame 150. In implementation of the facemask 100, the L-shaped pipe 610 may be mounted to the thermoregulation unit 110 nearby the cold-side fan 421, or to the frame 150.

FIG. 6D depicts two rear views of the facemask 100, where the facemask 100 further comprises one or more bags of desiccant 631-633 for reducing a relative humidity of the respirable air in the cavity 151. Preferably, calcium chloride ($CaCl_2$) is selected as a desiccant material deposited into the one or more bags of desiccant 631-633 for further moisture management due to its commercial availability and great hygroscopic capacity rather than other organic adsorbents such as silica gels. The estimated moisture absorption capability is about 4 g to 9 g of the moisture per unit gram of $CaCl_2$ under mean temperature 31° C. and relative humidity 85%. As examples for illustration, the desiccant bag 631 is disposed on the thermoregulation unit 110, and the two desiccant bags 632, 633 are respectively attached to two interior lateral sides of the frame 150. The desiccant bag 631 may be a 5-gram desiccant bag put on the heat exchanger 425. The desiccant bags 632, 633, each packed with desiccant of (2.50±0.05)g in average, may be attached to the frame 150.

As mentioned above, the first heat exchanger 425*a* is formed by a heat-exchanger heat sink covered with a perforated metallic sheet. FIG. 6E depicts a novel heat sink 650 for use as the heat-exchanger heat sink. The novel heat sink 650 includes one or more arrays 651 of conical rods 655 protruded from a bottom plate 652. Each array 651 of conical rods is designed to reduce the relative humidity. Fast draining of the condensed water vapor (in form of condensed droplets) on the conical rods 655 can be induced due to the curve rate difference in the two sides, thereby enabling fast removal of the condensed water vapor from the drawn respirable air (in the step 330). Besides, surfaces of the conical rods 655 are treated with superhydrophobic coating, while the surface of the bottom plate 652 is coated with a hydrophilic interface. The wettability pattern and curve rate gradient promote the draining of the droplets, resulting in lower relative humidity of the respirable air.

Figure 7:
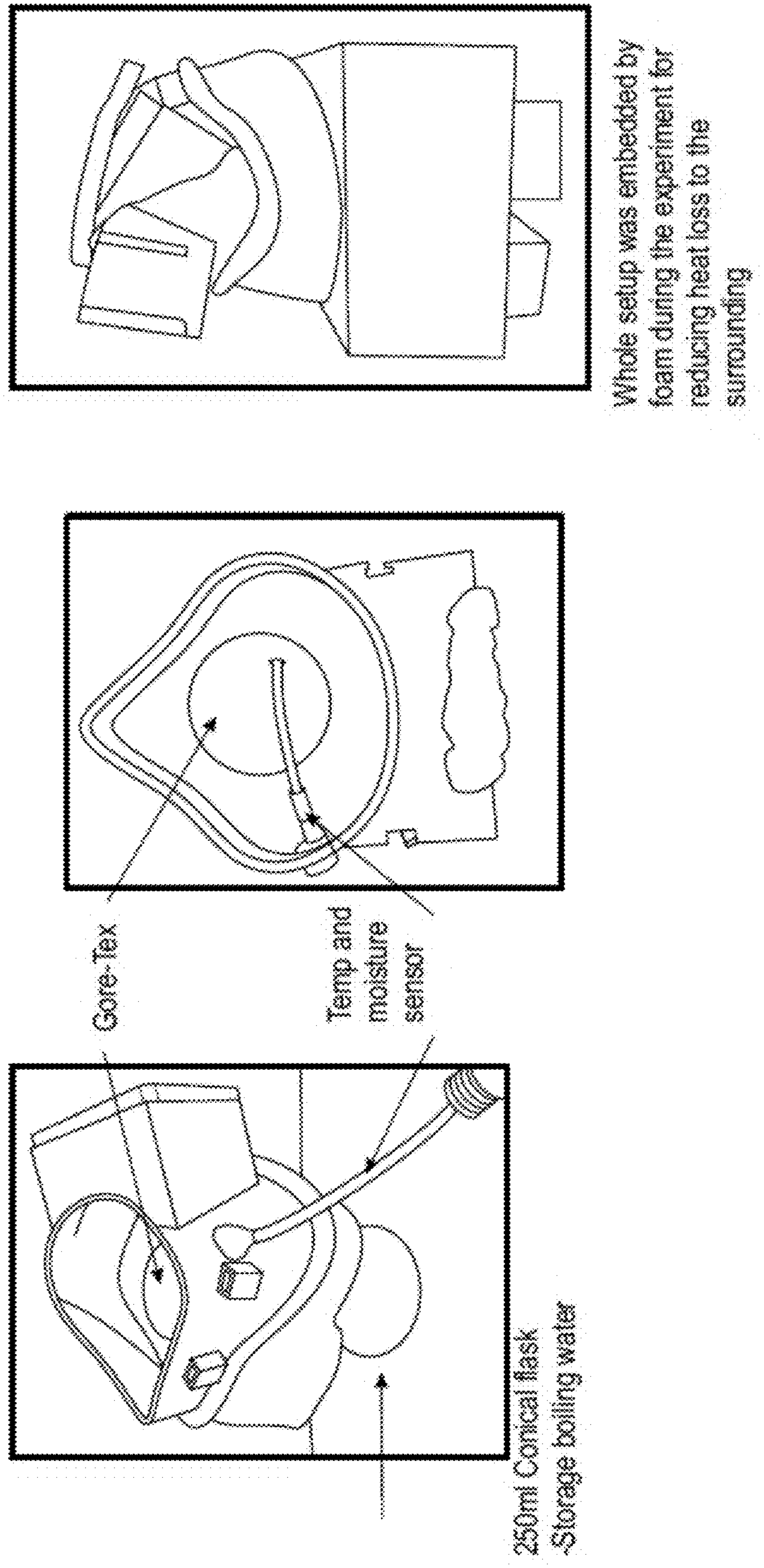
FIG. 7 depicts a steam test setup used in experiments.
Figure 8:
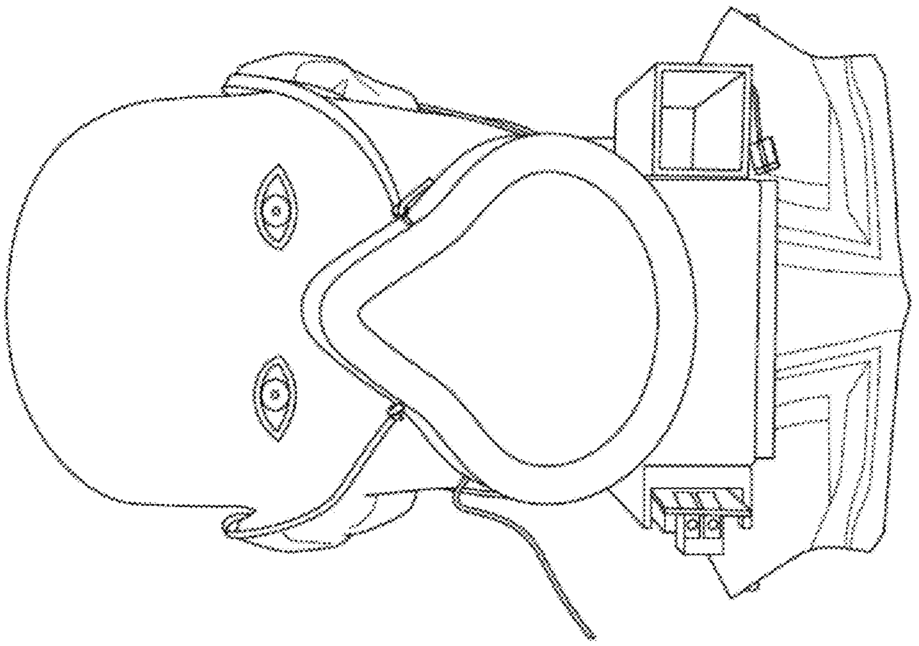
FIG. 8 depicts a human objective test setup used in the experiments.

In experiments, the above-mentioned two realizations of the thermoregulation unit 110 respectively having the first and second heat exchangers 425*a*, 425*b* were investigated. Applied voltages of the TE module 410 varied from 1V to 4V, and applied voltages of the cold- and hot-side fans 421, 431 varied from 5V to 11V. Numbers of perforated holes on the copper sheet of the first heat exchanger 425*a* were varied with two, four and eight rows for each channel of the plate-fin heat sink used in the first heat exchanger 425*a*. The second heat exchanger 425*b* was tested for guided air flow. Experimental data were obtained by conducting a steam test and a human objective test. FIGS. 7 and 8 respectively depict a steam test setup and a human objective test setup both used in the experiments.

To better examine the cooling performance of the facemask 100, the reduction in AT was calculated based on the measurement of variations in temperature and humidity by a commercial temperature and humidity sensing system. The AT is equivalent to a human-perceived equivalent temperature, which is calculated by $$AT = -2.653 + 0.994T + 0.0153T_d^2 \tag{1}$$

and $$T_d = \frac{243.04\left(\ln(RH) + \frac{17.625T}{243.04+T}\right)}{17.625 - \ln(RH) - \frac{17.625T}{243.04+T}}, \tag{2}$$

where: AT is the AT; T is the temperature; $T_d$ is the dew point temperature; and RH is the relative humidity. The AH was used to indicate the change in the amount of water vapor content in air inside the facemask 100. The AH is given by $$AH = \frac{C}{T}P_w = \frac{C}{T} * A\ 10^{\frac{mT}{T+T_n}}, \tag{3}$$

where C, A, m, and $T_n$ are certain constants. Both AT and AH were obtained based on values of the measured temperature and relative humidity inside the facemask 100.

Figure 9:
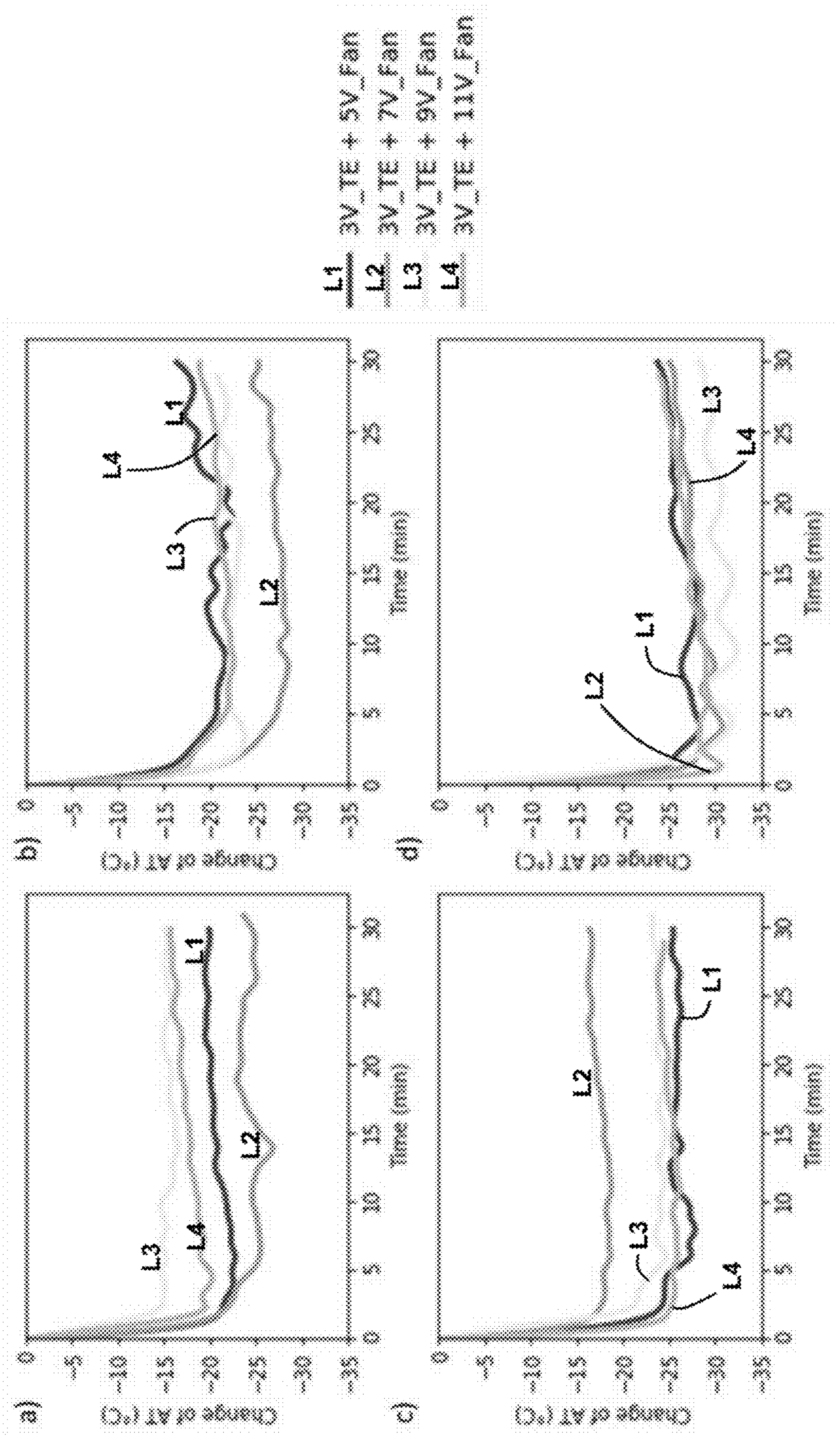
FIG. 9 depicts experimental results of steam test under a same voltage for powering the TE module, different voltages for powering the cold- and hot-side fans, and different choices of heat sink used in the heat exchanger.

According to the steam test, four cold-side heat sinks (i.e. heat-exchanger heat sinks) were evaluated under a constant voltage of 3V applied to the TE module 410. The reduction in AT is shown in FIG. 9 and Table 2. Specifically, FIG. 9 shows results of steam test regarding effects of the voltage applied to the cold- and hot-side fans 421, 431 on the AT in the facemask 100 under a constant voltage of 3V in powering the TE module 410, where the effects were evaluated under different cases of using (a) Heat Sink A, (b) Heat Sink B, (c) Heat Sink C, and (b) Heat Sink D. In all cases, the values of AT reached constant levels within 10 minutes. In particular, the AT was significantly reduced ranging from 15° C. based on Heat Sink A to over 30° C. based on Heat Sink D with a voltage of 9V applied to the hot-side fan 431.

TABLE 2

Change of AT on the basis of using different cold-side heat sinks when the voltage of TE module is fixed at 3 V.

| ° C. | Heat Sink A | Heat Sink B | Heat Sink C | Heat Sink D |
|---|---|---|---|---|
| 5 V | −20.2 ± 0.5 | −19.7 ± 1.7 | −25.8 ± 0.3 | −26.0 ± 1.2 |
| 7 V | −24.4 ± 1.0 | −27.0 ± 1.0 | −29.4 ± 0.8 | −27.0 ± 1.0 |
| 9 V | −15.7 ± 0.5 | −22.1 ± 0.7 | −24.0 ± 0.4 | −30.3 ± 0.9 |
| 11 V | −17.0 ± 0.8 | −20.8 ± 0.9 | −24.8 ± 0.7 | −26.5 ± 1.3 |

Figure 10A:
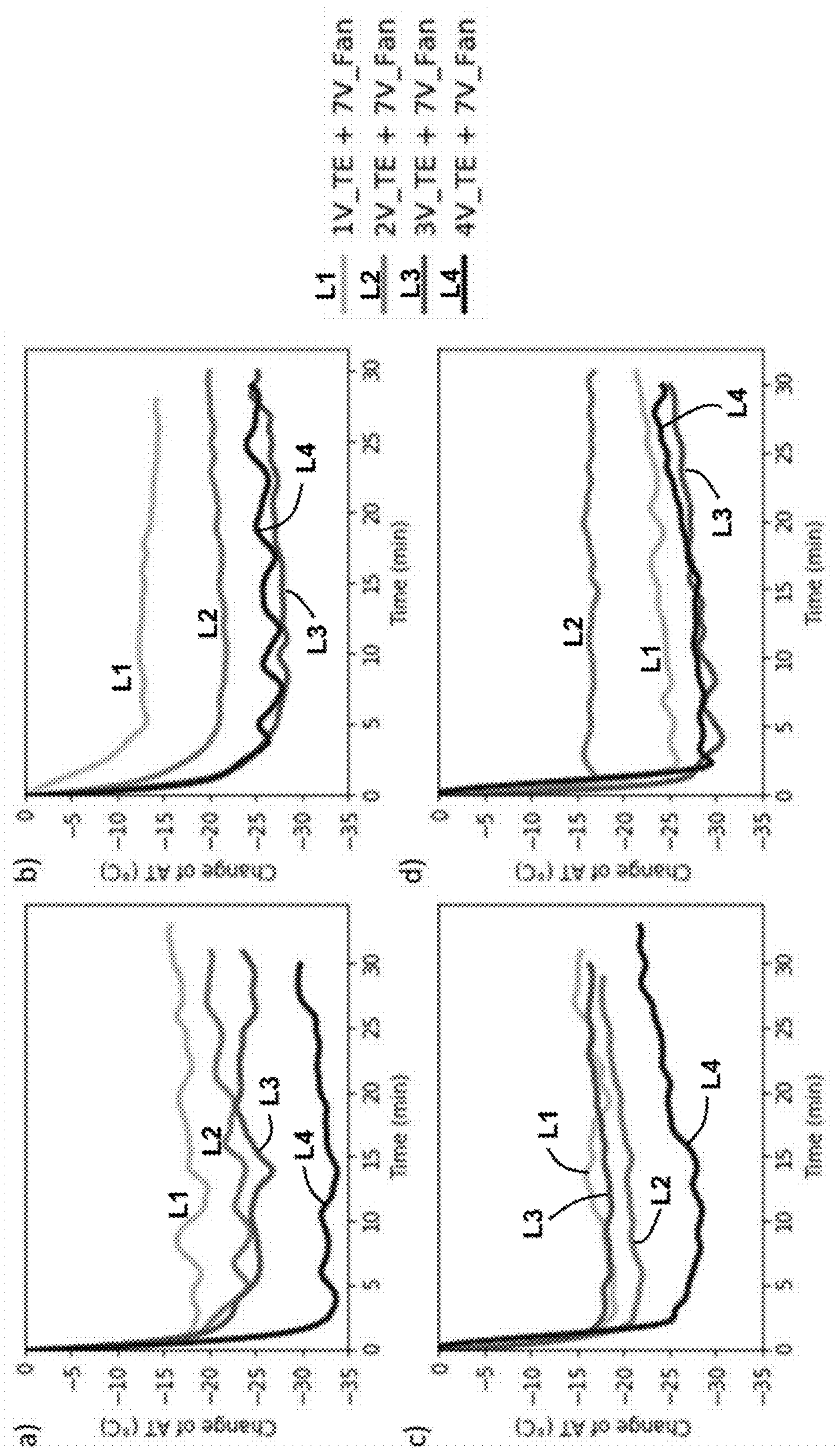
FIG. 10A depicts experimental results of steam test under different voltages for powering the TE module, a same voltage for powering the cold- and hot-side fans, and different choices of heat sink used in the heat exchanger.

FIG. 10A and Table 3 demonstrate the change of AT with different voltages applied to the TE module 410 under a fixed voltage of 7V applied to the cold- and hot-side fans 421, 431 for the four different types of heat sinks. Specifically, FIG. 10A shows results of steam test regarding effects of the voltage applied to the TE module 410 on the AT in the facemask 100 under a constant voltage of 7V in powering the cold- and hot-side fans 421, 431, where the effects were evaluated under different cases of using (a) Heat Sink A, (b) Heat Sink B, (c) Heat Sink C, and (d) Heat Sink D. The test process was the same to the one described in FIG. 5. It is shown that the reduction of AT is 13° C. with Heat Sink B when the TE-module voltage is 1V to over 30° C. when the TE-module voltage is 4V.

TABLE 3

Change of AT due to different voltages applied to the TE module when the voltage applied to each fan is fixed at 7 V.

| ° C. | Heat Sink A | Heat Sink B | Heat Sink C | Heat Sink D |
|---|---|---|---|---|
| 1 V | −17.5 ± 1.1 | −13.6 ± 0.7 | −16.5 ± 1.0 | −23.28 ± 0.9 |
| 2 V | −21.6 ± 1.3 | −20.8 ± 0.6 | −19.4 ± 1.1 | −16.5 ± 0.3 |
| 3 V | −24.4 ± 1.0 | −27.1 ± 1.0 | −29.4 ± 0.8 | −27.0 ± 1.0 |
| 4 V | −32.0 ± 1.3 | −25.8 ± 0.9 | −24.7 ± 2.2 | −26.1 ± 1.6 |

Figure 10B:
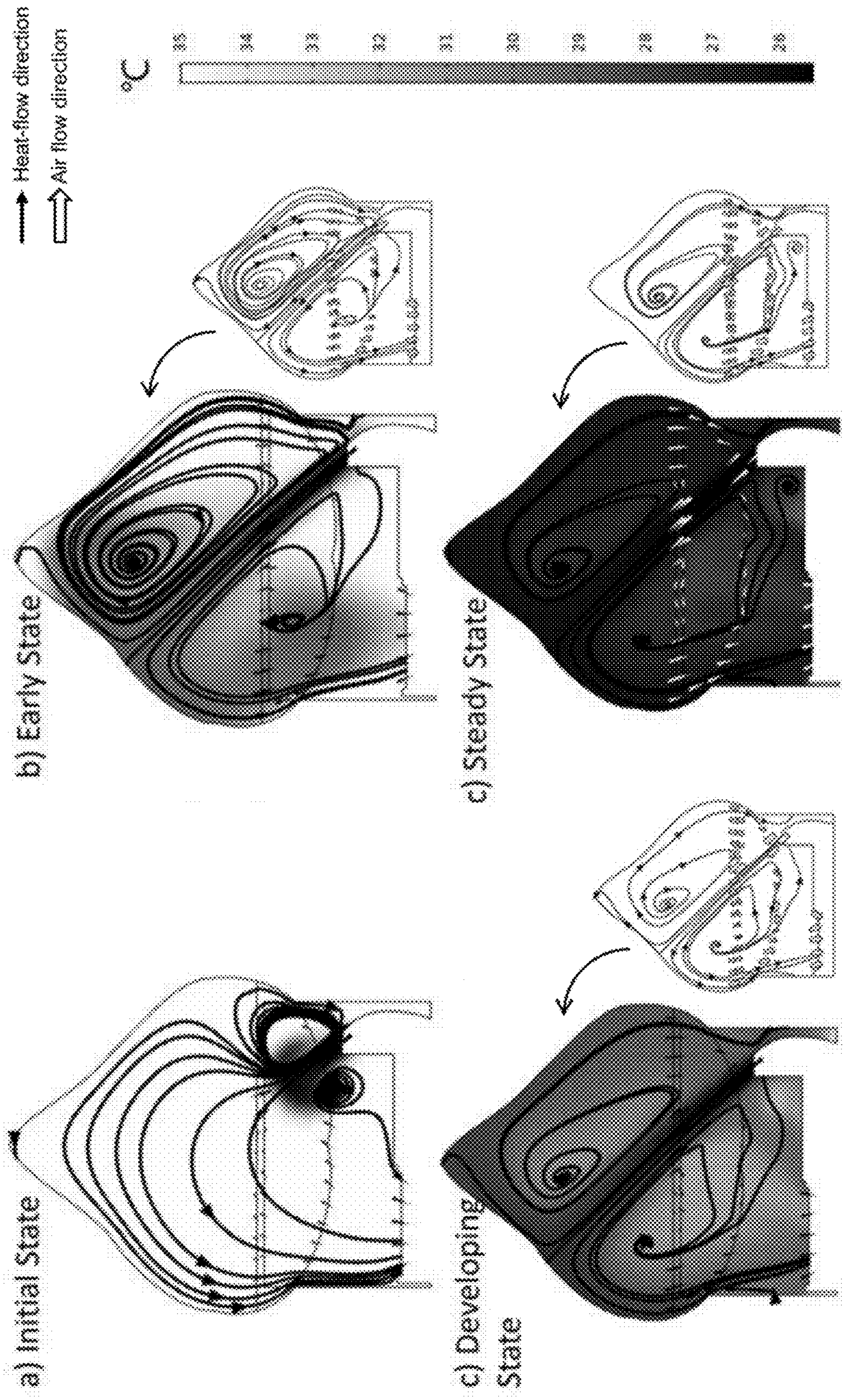
FIG. 10B depicts the temperature field combined with the streamline of the facemask with the wind-guide tunnel at the time of (a) Initial State, (b) Early State, (c) Developing State, and (d) Steady State.

FIG. 10B presents the temperature distribution with a streamline of the facemask 100 with the wind-guided tunnel at various states. Streamline shows that a high-velocity region is in a band-shape along the flowing direction of inlet air. The band-shape low-temperature region is overlapped with the high-velocity region (FIG. 10B-c). The wind-guided tunnel is effective since the fresh flowing air is guided to the central zone (close to the nose). Cool air with a temperature of 25° C. is flown to the nose zone. In the experiment, the inside temperature of the facemask 100 was substantially reduced from 35° C. (FIG. 13-*a*) to (25-27°) C. (FIG. 10B-d), indicating effectiveness of AC cooling.

Figure 11:
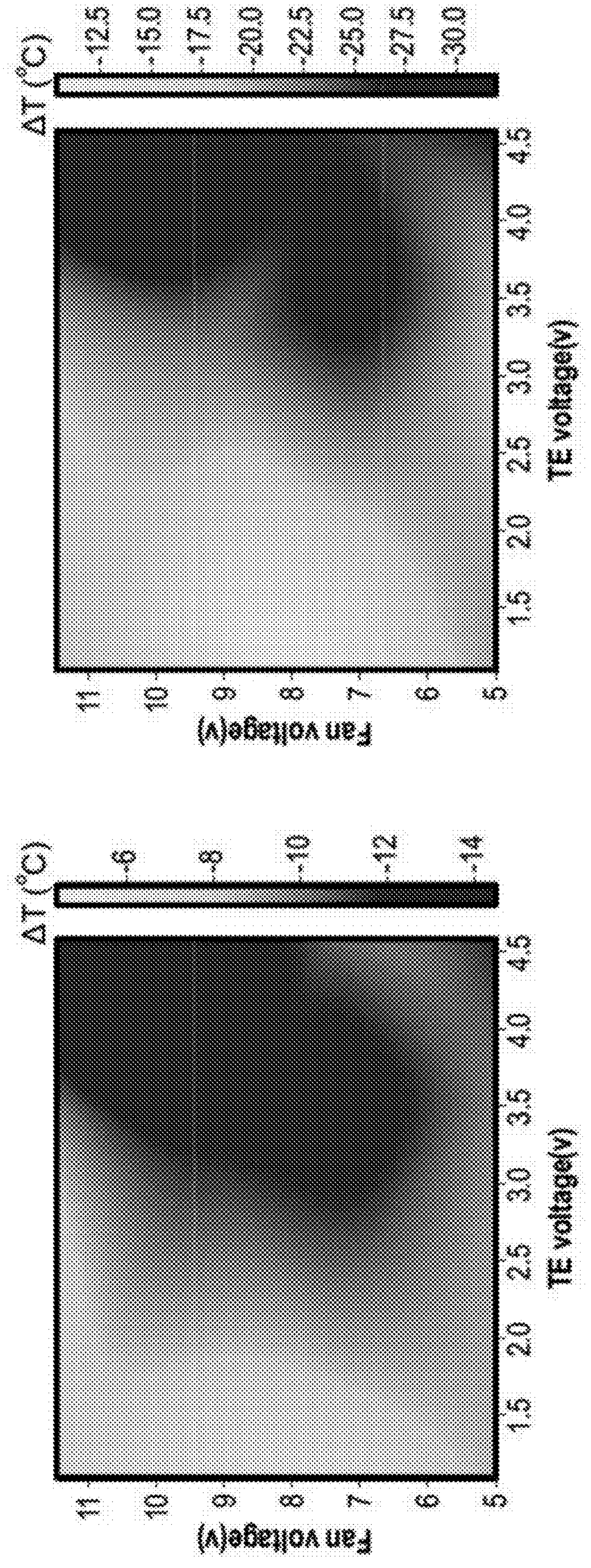
FIG. 11 depicts experimental results of temperature change and of AT change under different voltages applied to the TE module and cold- and hot-side fans on the basis of using Heat Sink B in the facemask.
Figure 12:
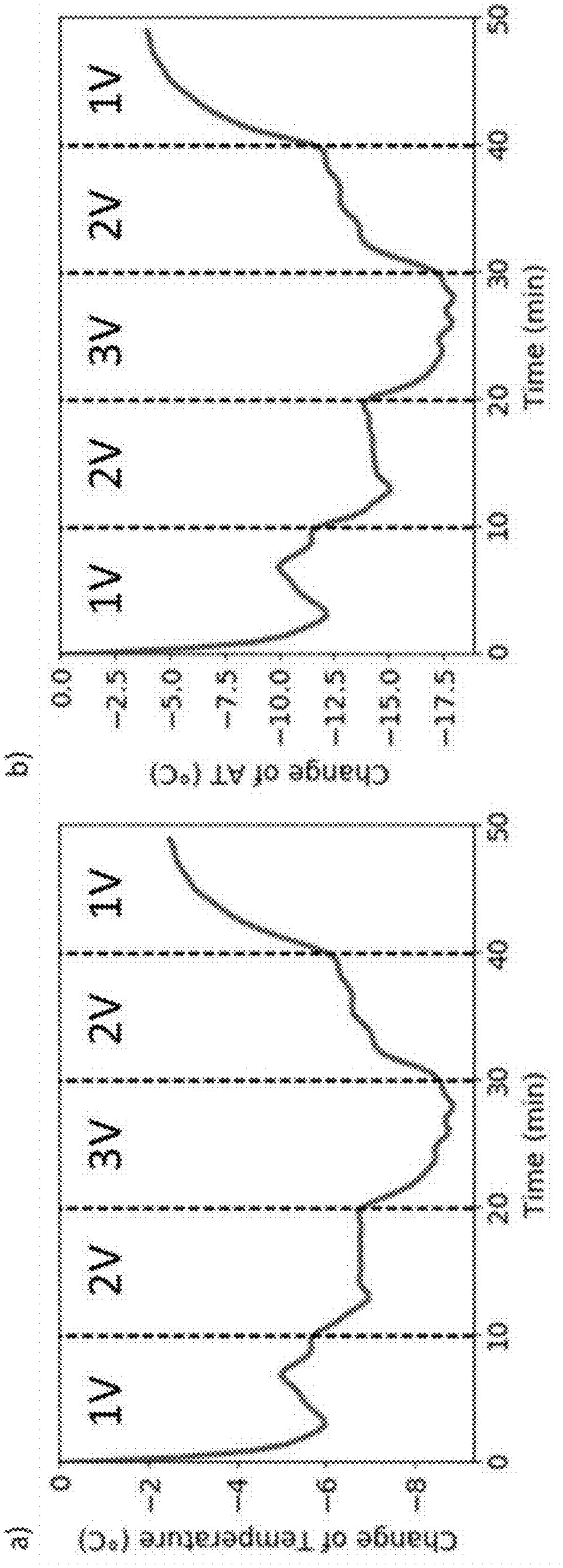
FIG. 12 shows experimental results of variation in temperature and in AT with the voltage applied to the TE module from 1V to 3V and then 3V to 1V with the voltage applied to the cold- and hot-side fans to be fixed at 7V on the basis of using Heat Sink B in the facemask.

To better realize the effects of voltages applied to both the TE module 410 and the cold- and hot-side fans 421, 431, and to explore the optimization of cooling performance, the change of AT was examined with different voltages applied to the TE module 410 and the cold- and hot-side fans on the basis of using Heat Sink B in the facemask 100. FIG. 11 lists the results. Specifically, FIG. 11 shows the results under different combinations of voltages applied to the TE module 410 and the cold- and hot-side fans 421, 431 on the basis of using Heat Sink B in the facemask 100, where subplot (a) shows the results of temperature change, and subplot (b) shows the results of AT change. The results of FIG. 11 indicates that the facemask 100 allows adjusting the temperature and AT towards the user's requirements. FIG. 12 shows the results under an event of applying a voltage to the TE module 410 from 1V to 3V and then reversing the voltage from 3V to 1V while fixing a voltage applied to the cold- and hot-side fans 421, 431 at 7V on the basis of using Heat Sink B in the facemask 100, where subplot (a) shows the results of temperature change, and subplot (b) shows the results of AT change. It is shown that both of the temperature and AT vary with the voltage sequence applied to the TE module 410.

In the human objective test, Heat Sink B and Heat Sink D with greater cooling performance were chosen for the human objective test by setting the voltages applied to the TE module 410 and the cold- and hot-side fans 421, 431 to 3V and 9V, respectively. During the experiments, the environmental temperature and AH remained at (30±1°) C. and (15.8±0.3)g/kg.

Figure 13:
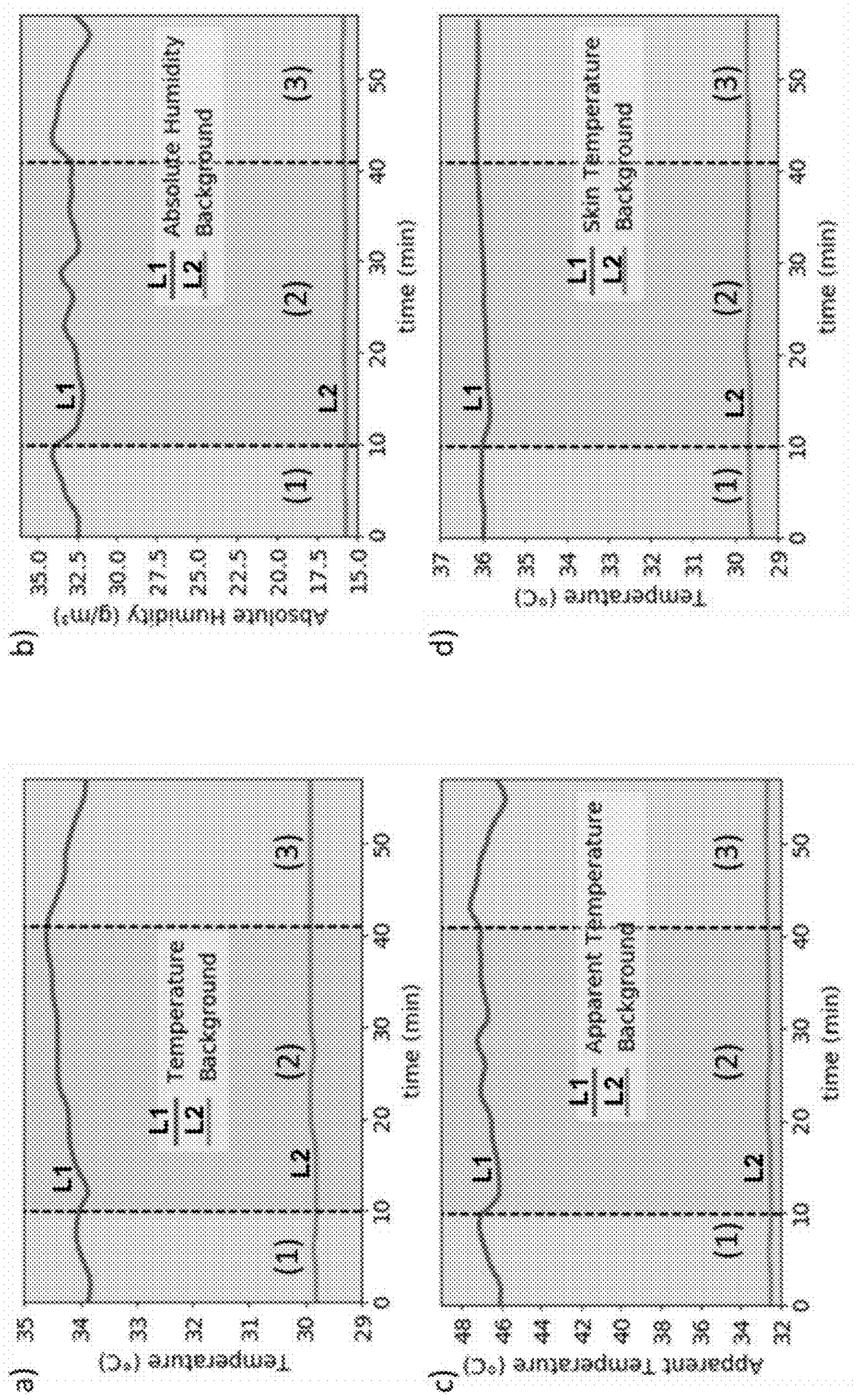
FIG. 13 shows a first set of experimental results of human objective test, where the experimental results are variations of microclimate temperature, AH, AT and skin temperature over time.

FIG. 13 shows results of human objective test regarding performance evaluation of the facemask 100 on the basis of using Heat Sink B when (1) the facemask 100 was put on, (2) 3V was applied to the TE module 410 and 9V was applied to turn on the hot-side fan 431, and (3) the TE module 410 and the hot-side fan 431 were turned off. In FIG. 13, subplots (a)-(d) show the performance evaluation results in microclimate temperature (ΔT=−0.51° C.±0.12° C.), in AH (ΔAH=−0.32 g/kg±0.64 g/kg), in AT (ΔAT=0.37° C.±0.42° C.), and in skin temperature (ΔT=0.02° C.±0.06° C.) with background temperature at 29.67° C.±0.03° C., respectively.

Figure 14:
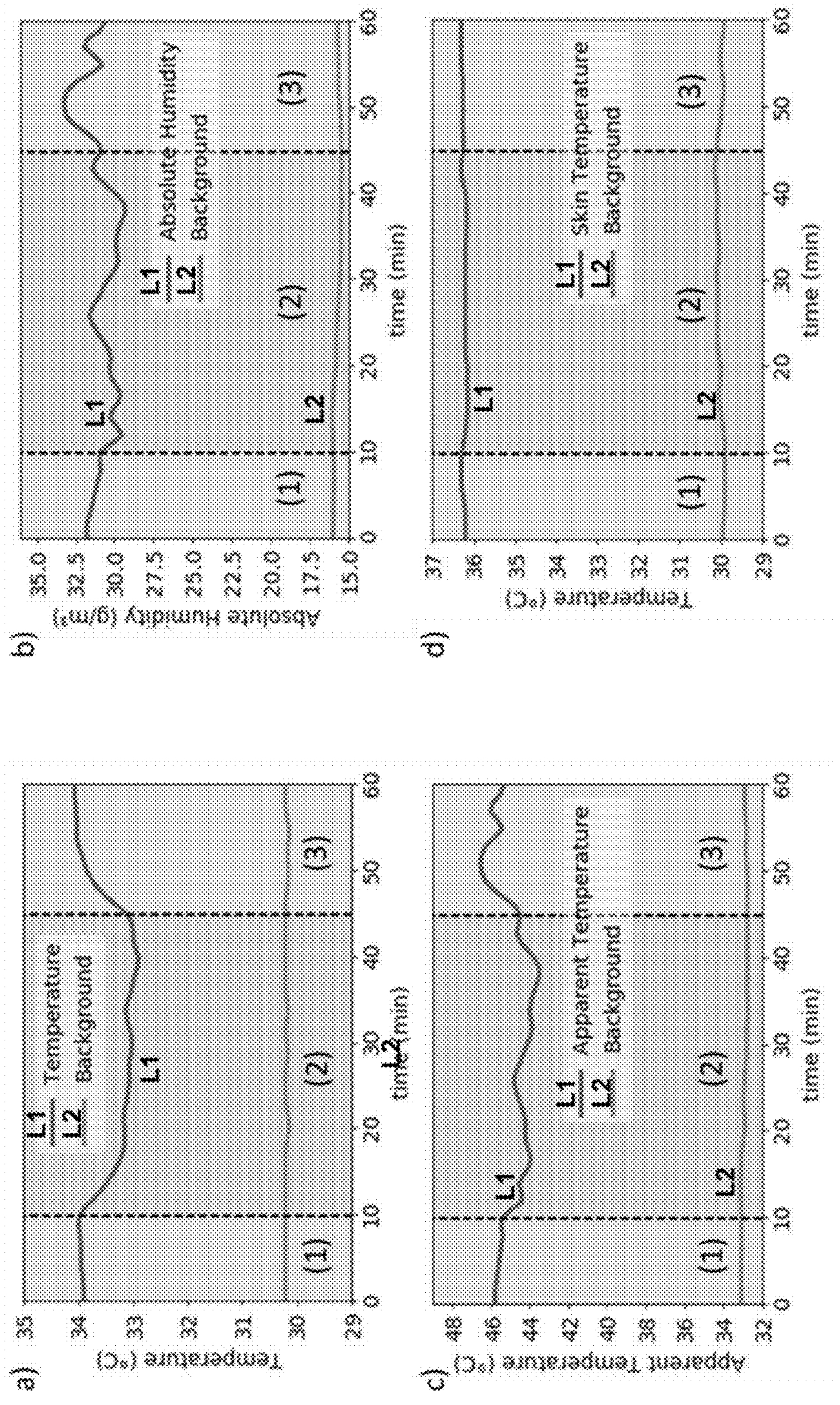
FIG. 14 shows a second set of experimental results of human objective test, where the experimental results are variations of microclimate temperature, AH, AT and skin temperature over time.

FIG. 14 shows results of human objective test regarding performance evaluation of the facemask 100 on the basis of using Heat Sink B when (1) the facemask 100 was put on, (2) 3V was applied to the TE module 410 and 9V was applied to turn on the hot-side fan 431, and (3) the TE module 410 and the hot-side fan 431 were turned off. In FIG. 14, subplots (a)-(d) show the performance evaluation results in microclimate temperature (ΔT=−0.87° C.±0.09° C.), in AH (ΔAH=−0.91 g/kg±0.74 g/kg), in AT (ΔAT=−1.39° C.±0.4° C.), and in skin temperature (ΔT=0.02° C.±0.06° C.) with background temperature at 29.99° C.±0.08° C., respectively.

Figure 15:
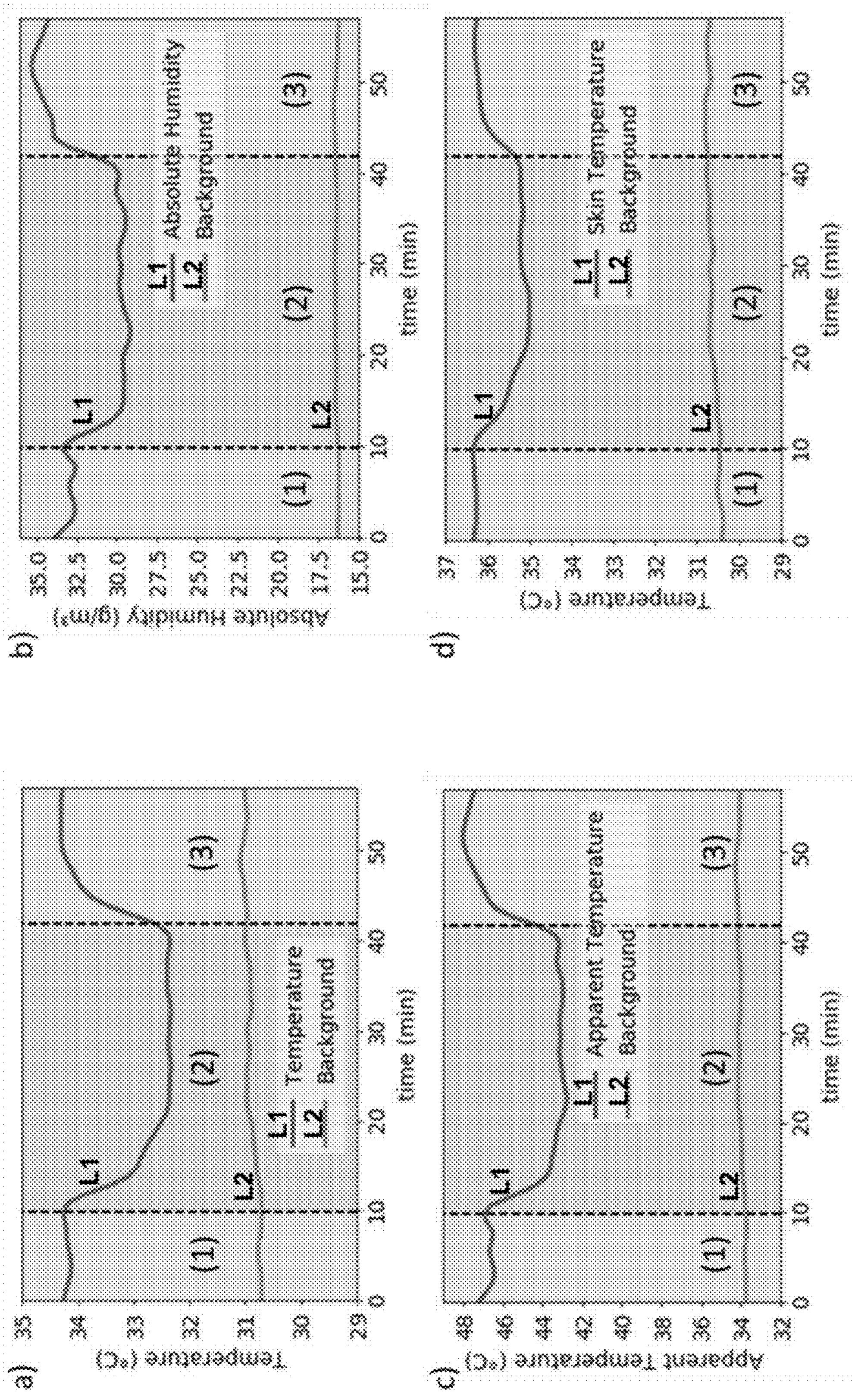
FIG. 15 shows a third set of experimental results of human objective test, where the experimental results are variations of microclimate temperature, AH, AT and skin temperature over time.

FIG. 15 shows results of human objective test regarding performance evaluation of the facemask 100 on the basis of using Heat Sink B when (1) the facemask 100 was put on, (2) the TE module 410 was turned on with a voltage of 3V and the cold- and hot-side fans 421, 431 were turned on with a voltage of 9V, and (3) the TE module 410 was turned off. In FIG. 15, subplots (a)-(d) show the performance evaluation results in microclimate temperature (ΔT=−1.82° C.±0.07° C.), in AH (ΔAH=−3.66 g/kg±0.65 g/kg), in AT (ΔAT=−3.82° C.±0.36° C.), and in skin temperature (ΔT=−1.17° C.±0.11° C.), respectively.

After the facemask 100 with Heat Skin B was put on by human subjects, there was no significant drop in microclimate temperature, AH, AT and skin temperature inside the facemask 100 when only the cold- and hot-side fans 421, 431 or the TE module 410 was operated, as shown in FIGS. 13 and 14. On the other hand, the temperature of the mask microclimate was dropped by (1.82±0.05°) C. with the TE module 410 turned on, as shown in FIG. 15(*a*). As well, the value of AH fell by (3.19±0.39)g/kg with great reduction in humidity and the result of AT in FIG. 15(*c*) was decreased by (3.59±0.23°) C. Meanwhile, the skin temperature was decreased by (1.17±0.11°) C. as shown in FIG. 15(*d*). The decreased AH helps to reduce the hot sensation or AT substantially, thus improving thermal comfort and easiness of breath for the user.

Figure 16:
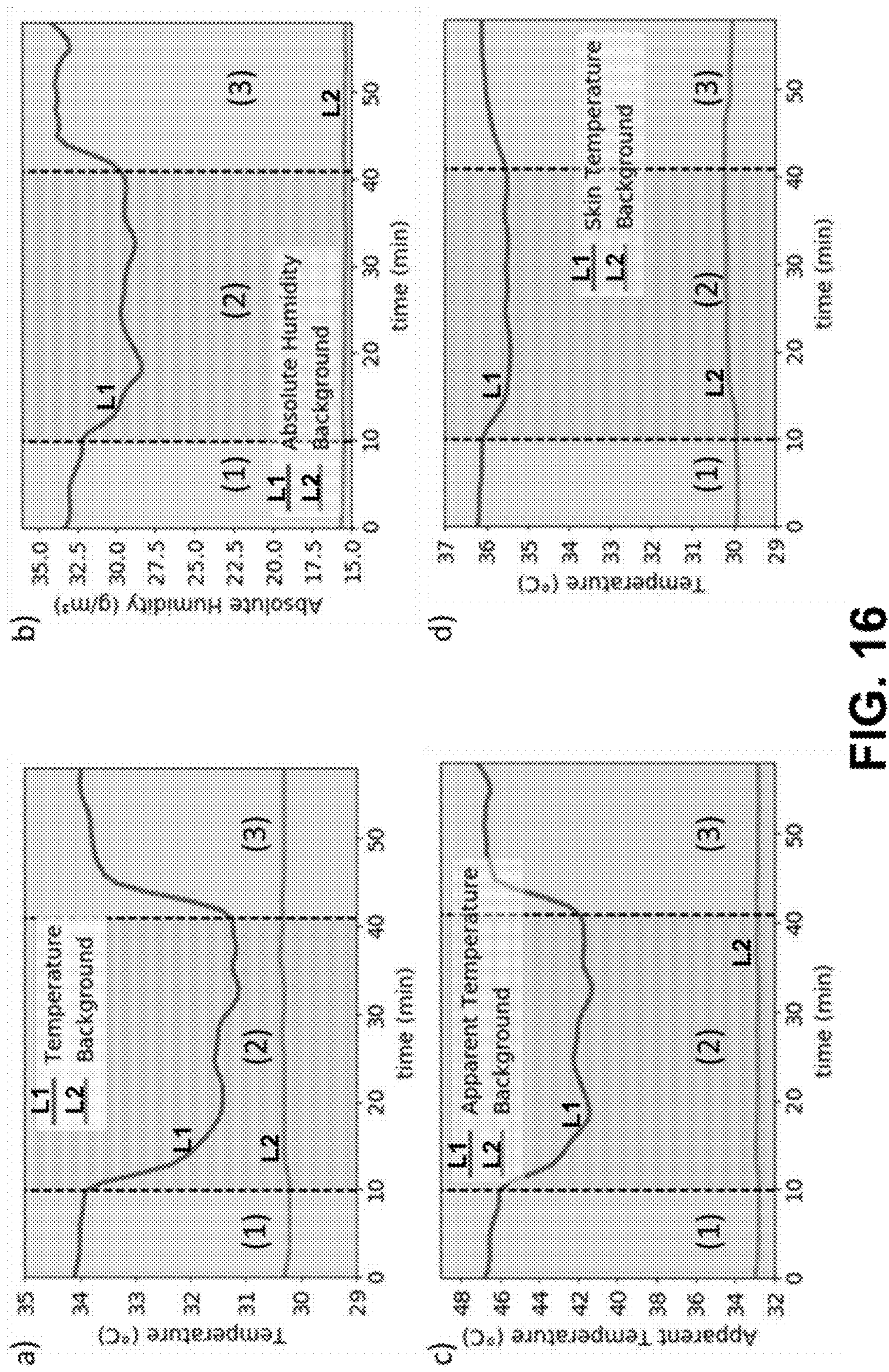
FIG. 16 shows a fourth set of experimental results of the human objective test, where the experimental results are variations of microclimate temperature, AH, AT, and skin temperature over time.

The facemask 100 on the basis of using Heat Sink D was also evaluated following the same procedure as shown in FIG. 16. FIG. 16 shows results of human objective test regarding performance evaluation of the facemask 100 on the basis of using Heat Sink D when (1) the facemask 100 was put on by the user, (2) the TE module 410 was turned on with a voltage of 3V and the cold- and hot-side fans 421, 431 were turned on with a voltage of 9V, and (3) the TE module 410 was turned off. In FIG. 16, subplots (a)-(d) show the performance evaluation results in microclimate temperature (AT=−2.57° C.±0.23° C.), in AH (ΔAH=−3.26 g/kg±0.74 g/kg), in AT (ΔAT=−4.41° C.±0.57° C.), and in skin temperature (ΔT=−0.62° C.±0.06° C.), respectively. It is noted that the reduction in the temperature and AH is (2.57±0.23°) C. and (3.26±0.74)g/kg, respectively, and the drop in AT is close to (4.41±0.57°) C., in consistent with the better cooling performance in the steam test. The greater drop in the overall temperature inside the facemask 100 resulted from the greater forced air flow guided by the tunnel towards closely to the subject's nose and mouth. The skin temperature inside the facemask 100 was also decreased by (0.62±0.06°) C. as demonstrated in FIG. 16(*d*).

Figure 17:
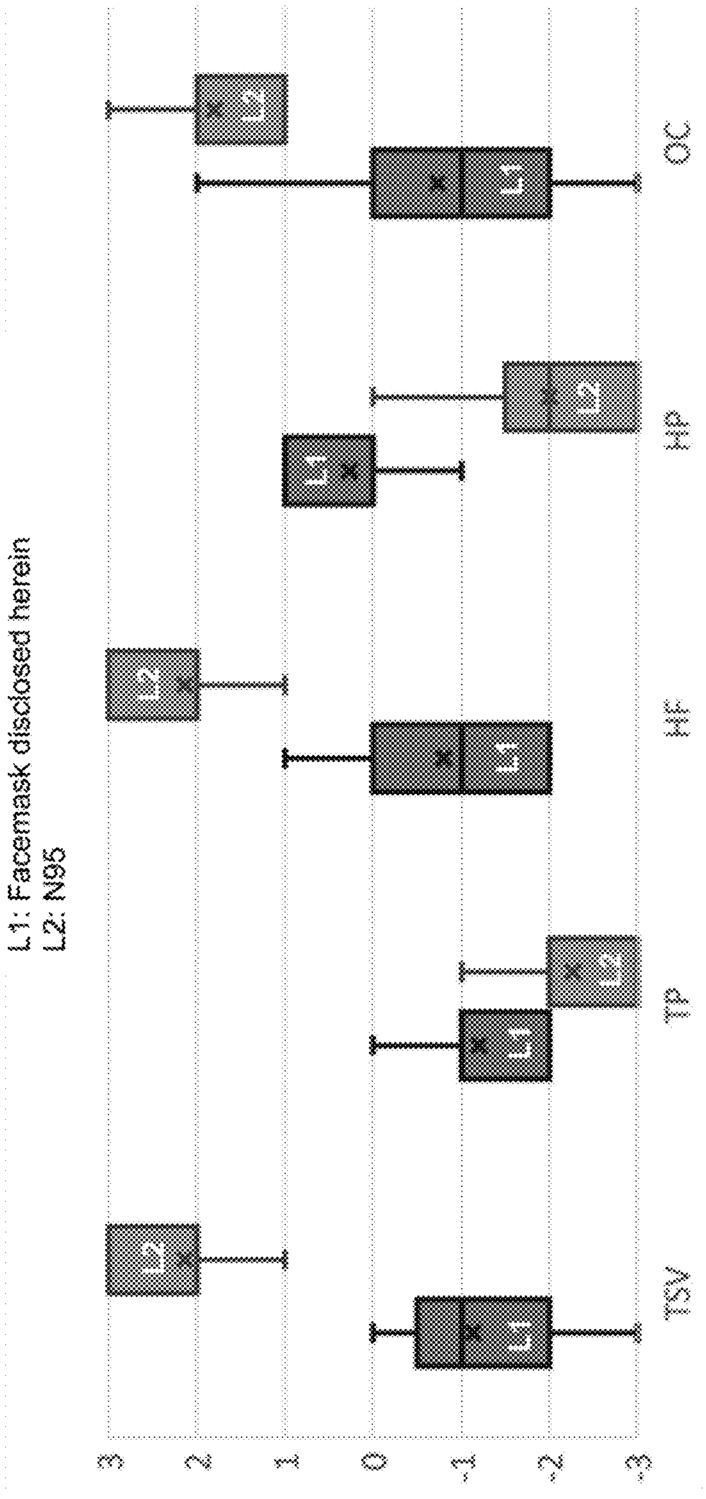
FIG. 17 is a graph depicting a summary of human subjective test results of the facemask installed with a wind guide tunnel.

As shown in FIG. 17, a human subjective test was carried out by rating, concerning five significant factors including Thermal Sensations Vote (TSV), Thermal Preference (TP), Humidity Feeling (HF), Humidity Preference (HP), and Overall Comfort (OC). The rating of cooling performance was conducted based on the N95 mask and the heat exchanger 425 with a wind guide tunnel. As seen in FIG. 17, the facemask 100 helped the subjects improve their dryness, coolness, and overall comfort. As well, the facemask 100 based on the programmable design of 3D printed frames (namely, for the frame 150) fitted most of the subjects. The cooling performance, coldness and overall comfort on the basis of the heat exchanger 425 (with the wind guide tunnel) were better than those with the N95 mask, showing the feasibility with the cooling function provided by the facemask 100.

To further reduce the temperature, $TiO_2$ particles are deposited into PLA material of the frame 150. Such particles are supposed to increase the heat loss through the radiative cooling effect by improving the surface emissivity of intermediate infrared. Besides, an automatic control system can be added to the facemask 100 to maintain a constant temperature inside the cavity 151. The system may be implemented with an integrated circuit chip with program codes, temperature and humidity sensors for feedback, and a displaying screen. Electrical energy can be utilized with higher efficiency by adjusting the on/off status.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A facemask for filtering atmospheric air to provide respirable air to a user, the facemask comprising:

a frame detachably attachable to a face of the user, the frame comprising an interior cavity for storing the respirable air providable to the user; and a thermoregulation unit mountable to the frame for accessing the cavity, the thermoregulation unit being configured to:

draw the respirable air from the cavity into the thermoregulation unit;

transfer heat from the drawn respirable air to an ambient atmosphere outside the frame so as to cool down the drawn respirable air and thereby condense at least part of water vapor from the drawn respirable air to form condensed water vapor;

remove the condensed water vapor from the drawn respirable air; and release the drawn respirable air to the cavity after the drawn respirable air is cooled and the condensed water vapor is removed such that the respirable air released back to the cavity is cooler and drier than the respirable air originally drawn;

wherein the thermoregulation unit comprises:

a mounting plate sealingly receivable by the frame for mounting the thermoregulation unit to the frame while avoiding the respirable air in the cavity from fluid communication with the ambient atmosphere, the mounting plate defining a cold side and a hot side of the thermoregulation unit such that the cold side is located in the cavity and the hot side is located outside the cavity when the thermoregulation unit is mounted to the frame;

a thermoelectric (TE) module installed in the mounting plate and arranged to access both the cold and hot sides, the TE module being formed as a Peltier heat pump for thermoelectrically transporting heat from the cold side to the hot side;

a heat exchanger installed on the cold side and contacted with the TE module for transferring heat received from the drawn respirable air to the TE module, the heat exchanger having one or more outlets for releasing the drawn respirable air back to the cavity, wherein the heat exchanger is formed by a heat-exchanger heat sink covered with a perforated metallic sheet, the perforated metallic sheet comprising a plurality of holes to form the one or more outlets; and a cold-side fan installed on the cold side and coupled to the heat exchanger for drawing the respirable air from the cavity to the heat exchanger.

2. The facemask of claim 1, wherein the cold-side fan is user-controllable in rotational speed such that an air flow generated by the cold-side fan is user-controllable.

3. The facemask of claim 1, wherein the cold-side fan is a side blow fan.

4. The facemask of claim 1, wherein the heat-exchanger heat sink of the heat exchanger is an aluminum plate-fin heat sink, and the perforated metallic sheet is made of copper.

5. The facemask of claim 1, wherein the heat-exchanger heat sink of the heat exchanger comprises one or more arrays of conical rods protruded from a bottom plate for draining the condensed water vapor on the one or more arrays of conical rods to thereby enable removal of the condensed water vapor from the drawn respirable air.

6. The facemask of claim 5, wherein respective conical rods in the one or more arrays of conical rods are coated with superhydrophobic coating, and the bottom plate is coated with a hydrophilic interface.

7. The facemask of claim 1, wherein the plurality of holes is arranged as two rows of holes.

8. The facemask of claim 1, wherein the plurality of holes is arranged as four rows of holes.

9. The facemask of claim 1, wherein the plurality of holes is arranged as eight rows of holes.

10. The facemask of claim 1, wherein the heat exchanger comprises a first wind guide and a second wind guide serially cascaded together, the first wind guide being arranged to receive the drawn respirable air from the cold-side fan, the second wind guide providing the one or more outlets for releasing the respirable air back to the cavity.

11. The facemask of claim 10, wherein the first and second wind guides are mutually substantially-perpendicular in orientation.

12. The facemask of claim 10, wherein the heat exchanger is formed by impermeable copper sheet.

13. The facemask of claim 1, wherein the thermoregulation unit further comprises:

a hot-side heat sink installed on the hot side and contacted with the TE module for receiving heat from the TE module and dissipating the received heat to the ambient atmosphere.

14. The facemask of claim 13, wherein the thermoregulation unit further comprises:

a hot-side fan installed on the hot side for forcibly dissipating the heat received by the hot-side heat sink.

15. The facemask of claim 13, wherein the hot-side heat sink is an aluminum plate-fin heat sink.

16. The facemask of claim 1, wherein the thermoregulation unit is detachably mountable to the frame.

17. The facemask of claim 1, wherein the frame further comprises:

an opening for receiving a surgical mask, the surgical mask being used for filtering the atmospheric air when the atmospheric air enters into the cavity through the surgical mask to augment with the respirable air already present in the cavity; and a sealing lock configured to sealingly fit to a circumference of the opening for securing the surgical mask on the circumference while sealing the opening.

18. The facemask of claim 1, wherein:

the frame further comprises:

an opening for receiving a surgical mask, the surgical mask being used for filtering the atmospheric air when the atmospheric air enters into the cavity through the surgical mask to augment with the respirable air already present in the cavity; and a sealing lock configured to sealingly fit to a circumference of the opening for securing the surgical mask on the circumference while sealing the opening;

and the facemask further comprises an L-shaped pipe connecting the surgical mask and an air inlet of the cold-side fan for drawing fresh filtered air nearby the surgical mask directly to the thermoregulation unit for cooling and drying to thereby further improve an air-conditioning performance of the facemask.

19. The facemask of claim 1 further comprising one or more bags of desiccant for reducing a relative humidity of the respirable air in the cavity.

20. The facemask of claim 19, wherein an individual bag of desiccant of the one or more bags of desiccant is deposited with calcium chloride as a desiccant material.

21. The facemask of claim 1, wherein the TE module is user-controllable in setting a direction of heat flow actualized by the TE module in transporting heat energy between the cold and hot sides.

22. The facemask of claim 1, wherein the frame is formed by 3D printing.

23. A facemask for filtering atmospheric air to provide respirable air to a user, the facemask comprising:

a frame detachably attachable to a face of the user, the frame comprising an interior cavity for storing the respirable air providable to the user; and a thermoregulation unit mountable to the frame for accessing the cavity, the thermoregulation unit being configured to:

draw the respirable air from the cavity into the thermoregulation unit;

transfer heat from the drawn respirable air to an ambient atmosphere outside the frame so as to cool down the drawn respirable air and thereby condense at least part of water vapor from the drawn respirable air to form condensed water vapor;

remove the condensed water vapor from the drawn respirable air; and release the drawn respirable air to the cavity after the drawn respirable air is cooled and the condensed water vapor is removed such that the respirable air released back to the cavity is cooler and drier than the respirable air originally drawn;

wherein the thermoregulation unit comprises:

a mounting plate sealingly receivable by the frame for mounting the thermoregulation unit to the frame while avoiding the respirable air in the cavity from fluid communication with the ambient atmosphere, the mounting plate defining a cold side and a hot side of the thermoregulation unit such that the cold side is located in the cavity and the hot side is located outside the cavity when the thermoregulation unit is mounted to the frame;

a thermoelectric (TE) module installed in the mounting plate and arranged to access both the cold and hot sides, the TE module being formed as a Peltier heat pump for thermoelectrically transporting heat from the cold side to the hot side;

a heat exchanger installed on the cold side and contacted with the TE module for transferring heat received from the drawn respirable air to the TE module, the heat exchanger having one or more outlets for releasing the drawn respirable air back to the cavity; and a cold-side fan installed on the cold side and coupled to the heat exchanger for drawing the respirable air from the cavity to the heat exchanger;

wherein the frame further comprises:

an opening for receiving a surgical mask, the surgical mask being used for filtering the atmospheric air when the atmospheric air enters into the cavity through the surgical mask to augment with the respirable air already present in the cavity; and a sealing lock configured to sealingly fit to a circumference of the opening for securing the surgical mask on the circumference while sealing the opening;

and wherein the facemask further comprises an L-shaped pipe connecting the surgical mask and an air inlet of the cold-side fan for drawing fresh filtered air nearby the surgical mask directly to the thermoregulation unit for cooling and drying to thereby further improve an air-conditioning performance of the facemask.

* * * * *